(12) United States Patent
Benkreira et al.

(10) Patent No.: US 11,151,527 B2
(45) Date of Patent: Oct. 19, 2021

(54) SYSTEMS CONFIGURED TO MANAGE CRYPTOCURRENCY WALLETS HAVING COST BASIS TRACKING AND METHODS OF USE THEREOF

(71) Applicant: Capital One Services, LLC, McLean, VA (US)

(72) Inventors: Abdelkader Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 63 days.

(21) Appl. No.: 16/717,665

(22) Filed: Dec. 17, 2019

(65) Prior Publication Data
US 2021/0182805 A1    Jun. 17, 2021

(51) Int. Cl.
| G06Q 20/06 | (2012.01) |
| G06Q 20/38 | (2012.01) |
| G06Q 20/36 | (2012.01) |

(52) U.S. Cl.
CPC ......... *G06Q 20/0655* (2013.01); *G06Q 20/36* (2013.01); *G06Q 20/381* (2013.01); *G06Q 20/387* (2013.01); *G06Q 2220/00* (2013.01)

(58) Field of Classification Search
None
See application file for complete search history.

(56) References Cited

U.S. PATENT DOCUMENTS

| 2008/0140547 | A1* | 6/2008 | Murphy | G06Q 40/12 705/30 |
| 2010/0036775 | A1* | 2/2010 | Edens | G06Q 40/06 705/36 R |
| 2015/0294425 | A1* | 10/2015 | Benson | G06Q 40/123 705/31 |
| 2015/0363770 | A1* | 12/2015 | Ronca | G06Q 20/10 705/66 |
| 2019/0303922 | A1* | 10/2019 | Hamasni | G06Q 20/389 |
| 2019/0340703 | A1* | 11/2019 | West | G06Q 20/00 |
| 2020/0034869 | A1* | 1/2020 | Harrison | G06Q 20/3678 |

* cited by examiner

*Primary Examiner* — Patrick McAtee
*Assistant Examiner* — Jason B Fenstermacher
(74) *Attorney, Agent, or Firm* — Greenberg Traurig, LLP

(57) ABSTRACT

Cryptocurrency can be stored in a plurality of cryptocurrency wallets associated with a plurality of respective users and managed by establishing a unit cost basis value for each cryptocurrency unit in a fiat currency. For example, a purchase request is received by a server computer from a user device. The purchase request is associated with a merchant to be paid in a cryptocurrency chosen by a user and stored in a cryptocurrency wallet of the user. A cryptocurrency exchange from multiple cryptocurrency exchanges having the best cryptocurrency exchange rate is identified for converting the chosen cryptocurrency to the fiat currency. A gain for the purchase transaction is calculated when the best cryptocurrency exchange rate is greater than the unit cost basis value of the chosen cryptocurrency stored in the cryptocurrency wallet of the user. The fiat currency converted in the identified cryptocurrency exchange is received from the cryptocurrency exchange to pay the merchant.

14 Claims, 12 Drawing Sheets

---

THE COST OF YOUR $110.50 PURCHASE IS:    0.01135819 BTC    ~250    180

THE TAX PAYMENT AMOUNT DUE FOR THIS TRANSACTION IS $5.79 USD — 255

DO YOU WANT TO ADD THE TAX PAYMENT AMOUNT DUE FOR A TOTAL TRANSACTION AMOUNT OF $116.29    ▼ YES  ~260

APPROVE CRYPTOCURRENCY EXCHANGE IN USD FOR THIS TOTAL TRANSACTION AMOUNT OF $116.29    265 ~ YES    NO  ~265

200

```
┌─────────────────────────────────────────────────────────────────┐
│ TO ALLOW RECEIPT OF YOUR CRYPTOCURRENCY COIN TRANSFER INTO      │
│ YOUR WALLET, PLEASE ENTER:                                      │
│                                                                 │
│ CRYPTOCURRENCY                                    ▼ BTC  ~202   │
│                                                                 │
│ NO. OF CRYPTOCURRENCY COINS (UNITS)          204 ~<enter number>│
│                                                                 │
│ DATE THESE COINS WERE PURCHASED              206 ~<enter date>  │
│                                                                 │
│ HOW MUCH DID YOU PAY FOR THESE COINS         208 ~<enter price> │
│ IN CURRENCY           ▼ USD ~210                                │
└─────────────────────────────────────────────────────────────────┘
```

```
┌─────────────────────────────────────────────────────────────────┐
│   YOUR REQUEST TO RECEIVE CRYPTOCURRENCY COINS INTO YOUR        │
│                      WALLET IS APPROVED                         │
│                                                                 │
│    PLEASE PROVIDE THE FOLLOWING PUBLIC KEY TO THE SENDER:       │
│                                                                 │
│            SKbSM5c56uFHdnYEg7fmUeb4rQxVKP ~220                  │
└─────────────────────────────────────────────────────────────────┘
```

```
┌─────────────────────────────────────────────────────────────────┐
│ THE COST OF THIS PURCHASE IS 110.50 USD ~230                    │ ~180
│                                                                  │
│ YOUR WALLET IS CURRENTLY HOLDING:                                │
│                                                                  │
│ 0.51052    BTC ~235    ------>    $4,968.88    USD ~240         │
│ 251.25     ETH ~235    ------>    $5,186.91    USD ~240         │
│ 15350.26   XRP ~235    ------>    $4,708.20    USD ~240         │
│                                                          ~245    │
│ WHICH CRYPTOCURRENCY WOULD YOU LIKE TO USE:   [▽ BTC]           │
└─────────────────────────────────────────────────────────────────┘
```

FIG. 3A

```
┌─────────────────────────────────────────────────────────────────┐
│ THE COST OF YOUR $110.50 PURCHASE IS:   0.01135819 BTC ~250     │ ~180
│                                                                  │
│ THE TAX PAYMENT AMOUNT DUE FOR THIS TRANSACTION IS $5.79 USD ~255│
│                                                                  │
│ DO YOU WANT TO ADD THE TAX PAYMENT AMOUNT DUE FOR A TOTAL       │
│ TRANSACTION AMOUNT OF $116.29              [▽ YES] ~260         │
│                                                                  │
│ APPROVE CRYPTOCURRENCY EXCHANGE IN USD FOR THIS TOTAL            │
│ TRANSACTION AMOUNT OF $116.29      [ YES ]   [ NO ] ~265        │
│                                     265                          │
└─────────────────────────────────────────────────────────────────┘
```

FIG. 3B

```
┌─────────────────────────────────────────────────────────────────┐
│ TRANSACTION COMPLETED: BEST EXECUTION PRICE ON COINBASE ~270    │ ~180
│                                                                  │
│ YOU SOLD 0.01195334 BTC ~275 WHICH WAS DEDUCTED FROM YOUR WALLET│
│                                                                  │
│ FOR THE $110.50 MERCHANT TRANSACTION AT 5:34:08 PM JULY 15, 2018 ~277│
│                                                                  │
│ AND PAID $5.79 FOR TAXES DUE ON THIS TRANSACTION ~280            │
│                                                                  │
│ TOTAL TAXES HELD IN YOUR TAX PAYMENT SECONDARY ACCOUNT AS        │
│ OF THIS TRANSACTION: $75.37 ~285                                 │
└─────────────────────────────────────────────────────────────────┘
```

FIG. 3C 290 291

Receiving a plurality of cryptocurrency storage requests to send cryptocurrency for storage in a plurality of cryptocurrency wallets associated with a plurality of respective users

292

Accepting the cryptocurrency for storage in each cryptocurrency storage request from the plurality of cryptocurrency storage requests when a unit cost basis value is computed for each cryptocurrency unit in a fiat currency for each cryptocurrency storage request from the plurality of cryptocurrency storage requests

293

Receiving a purchase request from at least one user from the plurality of users to perform a purchase transaction with a merchant to be paid in a cryptocurrency chosen by the at least one user of the plurality of users

294

Communicating in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency

295

Receiving a payment acceptance from the at least one user for the purchase transaction to be paid in the chosen cryptocurrency at the best cryptocurrency exchange rate and a cryptocurrency-based tax payment amount in the fiat currency due when converting the chosen cryptocurrency to the fiat currency to pay for the purchase transaction

296

Transferring a purchase transaction-related number of cryptocurrency units in the chosen cryptocurrency from the cryptocurrency wallet of the at least one user to the identified cryptocurrency exchange in response to the payment acceptance

297

Receiving the fiat currency converted in the identified cryptocurrency exchange from the purchase transaction-related number of cryptocurrency units in the chosen cryptocurrency

298

Transferring the cryptocurrency-based tax payment amount in the fiat currency to a secondary account of the at least one user, and the cryptocurrency-based payment of the purchase transaction in the fiat currency to an account of the merchant

FIG. 4

SYSTEMS CONFIGURED TO MANAGE CRYPTOCURRENCY WALLETS HAVING COST BASIS TRACKING AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based systems configured for one or more novel technological applications to manage cryptocurrency wallets having cost basis tracking and methods of use thereof.

BACKGROUND OF TECHNOLOGY

A computer network platform/system may include a group of computers (e.g., clients, servers, smart routers and other computing hardware devices that are linked together through one or more communication channels to facilitate communication and/or resource-sharing, via one or more specifically programmed graphical user interfaces (GUIs) of the present disclosure, among a wide range of users.

SUMMARY

In some embodiments, the present disclosure provides an exemplary technically improved computer-based method for managing cryptocurrency wallets having cost basis tracking and uses thereof that includes at least the following steps:

receiving, by a server computer communicatively coupled to a communication network, a plurality of cryptocurrency storage requests to send cryptocurrency for storage in a plurality of cryptocurrency wallets associated with a plurality of respective users;

wherein each respective cryptocurrency wallet may be managed by the server computer;

accepting, by the server computer, the cryptocurrency for storage in each cryptocurrency storage request from the plurality of cryptocurrency storage requests when a unit cost basis value is computed for each cryptocurrency unit in a fiat currency for each cryptocurrency storage request from the plurality of cryptocurrency storage requests;

receiving, by the server computer, a purchase request from at least one user from the plurality of users to perform a purchase transaction with a merchant to be paid in a cryptocurrency chosen by the at least one user of the plurality of users;

wherein the chosen cryptocurrency may be stored in the cryptocurrency wallet of the at least one user;

wherein the purchase request may include a fiat purchase amount in the fiat currency;

communicating, by the server computer, in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency;

receiving, by the server computer, a payment acceptance from the at least one user for the purchase transaction to be paid in the chosen cryptocurrency at the best cryptocurrency exchange rate and a cryptocurrency-based tax payment amount in the fiat currency due when converting the chosen cryptocurrency to the fiat currency to pay for the purchase transaction;

transferring, by the server computer, a purchase transaction-related number of cryptocurrency units in the chosen cryptocurrency from the cryptocurrency wallet of the at least one user to the identified cryptocurrency exchange in response to the payment acceptance;

receiving, by the server computer, the fiat currency converted in the identified cryptocurrency exchange from the purchase transaction-related number of cryptocurrency units in the chosen cryptocurrency; and transferring, by the server computer, the cryptocurrency-based tax payment amount in the fiat currency to a secondary account of the at least one user, and the cryptocurrency-based payment of the purchase transaction in the fiat currency to an account of the merchant.

In some embodiments, the present disclosure provides an exemplary technically improved computer-based system that includes at least the following components of a server computer for managing cryptocurrency wallets having cost basis tracking and uses thereof. The server computer may include a memory and a processor, communicatively coupled to a communication network. The processor may be configured to:

receive a plurality of cryptocurrency storage requests to send cryptocurrency for storage in a plurality of cryptocurrency wallets associated with a plurality of respective users;

wherein each respective cryptocurrency wallet may be managed by the server computer;

accept the cryptocurrency for storage in each cryptocurrency storage request from the plurality of cryptocurrency storage requests when a unit cost basis value is computed for each cryptocurrency unit in a fiat currency for each cryptocurrency storage request from the plurality of cryptocurrency storage requests;

receive a purchase request from at least one user from the plurality of users to perform a purchase transaction with a merchant to be paid in a cryptocurrency chosen by the at least one user of the plurality of users;

wherein the chosen cryptocurrency may be stored in the cryptocurrency wallet of the at least one user;

wherein the purchase request may include a fiat purchase amount in the fiat currency;

communicate in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency;

receive a payment acceptance from the at least one user for the purchase transaction to be paid in the chosen cryptocurrency at the best cryptocurrency exchange rate and a cryptocurrency-based tax payment amount in the fiat currency due when converting the chosen cryptocurrency to the fiat currency to pay for the purchase transaction;

transfer a purchase transaction-related number of cryptocurrency units in the chosen cryptocurrency from the cryptocurrency wallet of the at least one user to the identified cryptocurrency exchange in response to the payment acceptance;

receive the fiat currency converted in the identified cryptocurrency exchange from the purchase transaction-related number of cryptocurrency units in the chosen cryptocurrency; and transfer the cryptocurrency-based tax payment amount in the fiat currency to a secondary account of the at least one user, and the cryptocurrency-based payment of the purchase transaction in the fiat currency to an account of the merchant.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 2A and 2B depict an exemplary graphic user interface for managing a cryptocurrency storage request, in accordance with one or more embodiments of the present disclosure;

FIGS. 3A-3C depict exemplary views of a graphic user interface (GUI) on a screen of a user device during a purchase transaction, in accordance with one or more embodiments of the present disclosure;

FIG. 4 illustrates a flowchart of a first exemplary method for managing cryptocurrency wallets having cost basis tracking and uses thereof, in accordance with one or more embodiments of the present disclosure;

DETAILED DESCRIPTION

Figure 1:
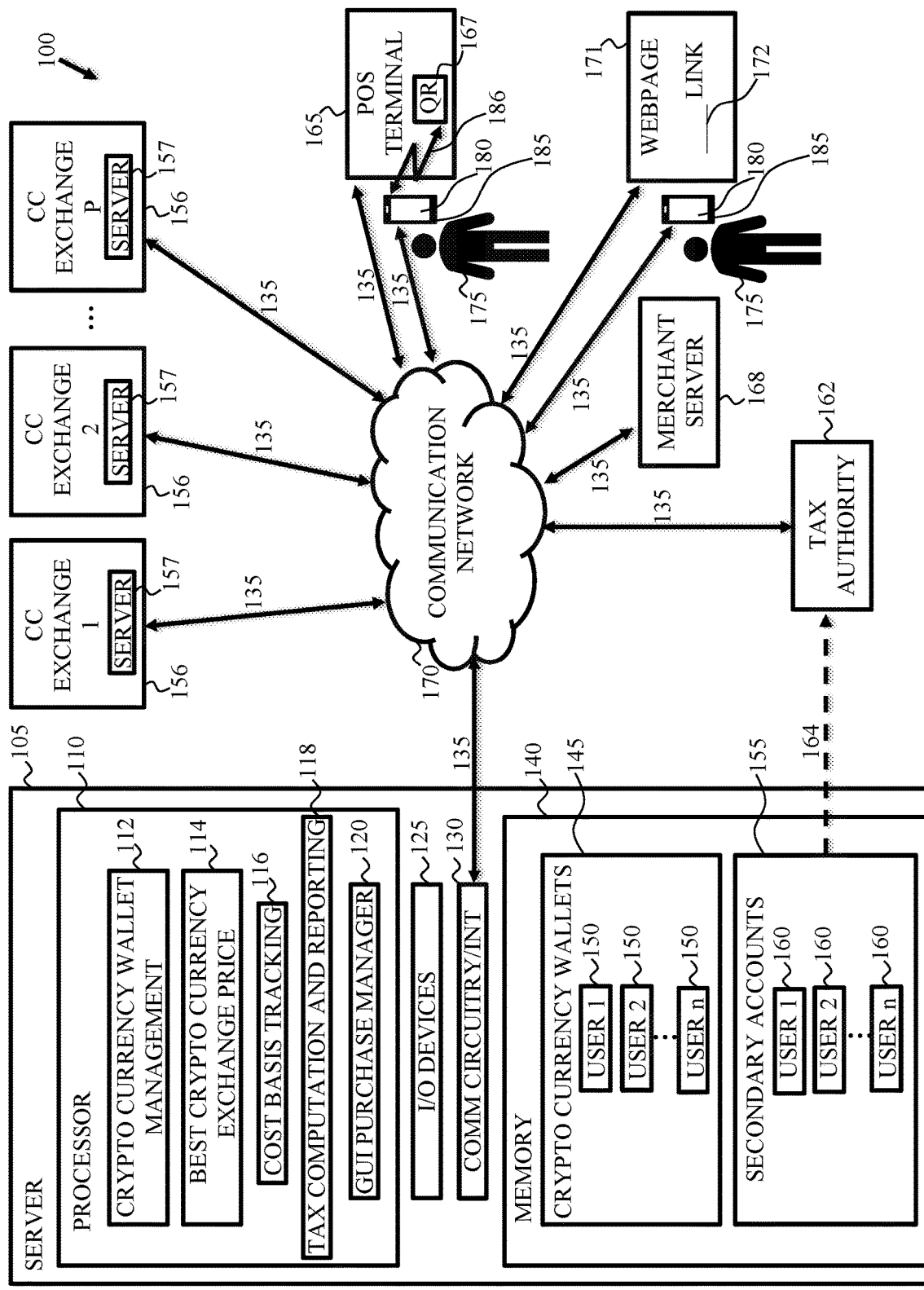
FIG. 1 depicts an exemplary inventive system for managing cryptocurrency wallets having cost basis tracking and uses thereof, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Cryptocurrency may be purchased and/or transferred into cryptocurrency wallets for storage. The cryptocurrency wallets may be configured to hold private and public authentication keys, for example, for the cryptocurrency stored in the wallet. When a user of cryptocurrency desires to use the cryptocurrency stored in a wallet of the user, either through a cryptocurrency transfer to another user, or a sale of cryptocurrency during a merchant purchase, the user typically sends information over a communication network to a recipient (e.g., another user or a cryptocurrency exchange) with at least a public key and the number of cryptocurrency units associated with a cryptocurrency type, such as Bitcoin, Ethereum, Ripple, for example, held in the wallet.

This information may be used to record the transfer of the cryptocurrency units from the sender to the recipient onto a blockchain ledger tracking the ownership of the cryptocurrency units of a particular type in-circulation. In addition to the information sent to the recipient, the private key of the user may be used in the transaction to digitally authenticate ownership of the cryptocurrency by the user before recording the ownership transfer transaction of the cryptocurrency units on the blockchain ledger.

Typically, the transfer and/or use of cryptocurrency in purchase transactions of goods and/or services may occur without any prior knowledge as to how much the user paid in fiat currency (e.g., U.S. Dollars, euros, Swiss francs, etc.) for the cryptocurrency and/or the value of the cryptocurrency in fiat currency at the time that the cryptocurrency was transferred to the user's wallet. Thus, the cost basis for every cryptocurrency acquisition by the user is typically not established, nor electronically recorded in a respective blockchain and/or in an off-blockchain database. Furthermore, the value of any type of cryptocurrency relative to any fiat currency is market-based, and thus, the value may fluctuate at any instant. Thus, a loss or a gain in value of any cryptocurrency relative to a fiat currency may occur at any instant which requires considerable computing resources to track such potentially instantaneous fluctuations.

Different governmental agencies worldwide now view the use of cryptocurrency in any transaction as a taxable event. When a user, for example, uses cryptocurrency to purchase goods and/or services in purchase transactions, the gain for that transaction may be defined as the value of the cryptocurrency units in fiat currency used to pay the merchant when the cryptocurrency units relative to the value of the same cryptocurrency units in fiat currency at the time of the user's acquisition. The gain in each purchase transaction may be used to determine a tax payment amount owed to the tax authority for every purchase transaction that cryptocurrency may be used to pay for the goods and/or services.

In some embodiments, the present disclosure herein provides for managing cryptocurrency wallets having cost basis tracking and uses thereof. At least one technical solution that the illustrative inventive systems and methods of the present disclosure provide is based on maintaining a cost basis for every type of cryptocurrency and its correspondence to a number of cryptocurrency units stored in the user's cryptocurrency wallet, which is needed for accessing the tax payment amount owed to the tax authorities for every purchase transaction that cryptocurrency is used by the user to pay for the goods and/or services.

Furthermore, in at least some embodiments, the illustrative inventive systems are configured to assist the user and/or tax preparer in tax reporting to the tax authority by maintaining the tax payment amount owed for every purchase transaction using cryptocurrency stored in the user's cryptocurrency wallet. Additionally, and/or optionally, in at least some embodiments, the illustrative inventive systems are configured to directly pay the tax payment amount owed by the user to the tax authority for every purchase transaction using cryptocurrency stored in the user's cryptocurrency wallet.

FIG. 1 depicts an exemplary inventive system 100 for managing cryptocurrency wallets having cost basis tracking and uses thereof, in accordance with one or more embodiments of the present disclosure. System 100 may include a server computer 105 of a financial institution or entity, multiple servers 157 of respective multiple cryptocurrency exchanges 156, at least one user device 185 of at least one respective user 175 from a plurality of users at a point-of-sale (POS) terminal 165 of a merchant, a computer terminal 171 with a webpage managed by the merchant, a server 168 of the merchant, and a server 162 of a tax authority, all communicating 135 over a communication network 170. User device 185 may include a smartphone, a cellphone, a tablet, and the like.

In some embodiments, server computer 105 may include a processor 110, input/output devices 125, communication circuitry and interface 130 to enable server computer 105 to communicate 135 over communication network 170, and a memory 140.

Processor 110 may execute software modules stored for example in memory 140. The software modules may include a cryptocurrency wallet management module 112, a best cryptocurrency exchange price assessment module 114, a cost basis tracking module 116, tax computation and reporting module 118, and a graphic user interface (GUI) module 120. Memory 140 may store a number of databases, which may include a database 145 of cryptocurrency wallets 150 and a secondary accounts database 155 with user accounts 160.

In some embodiments, cryptocurrency wallet database 145 may include a digital cryptographic wallet for a plurality of users, each user wallet denoted as user1, user2, . . . and usern. There may be n users where n is an integer. Each user wallet may include not only the cryptographic credentials (unique public and private keys) and the cryptocurrency portfolio (e.g., at least one cryptocurrency type and number of cryptocurrency units for each type) for each user, but also cost basis data for each cryptocurrency stored in each user wallet which may be managed by cryptocurrency wallet management module 112.

In some embodiments, input/output devices 125 may include a plurality of electronic ports such as USB ports, for example, for coupling cryptocurrency hardware wallets to server computer 105. Cryptocurrency hardware wallets may be used to store the cryptographic credentials (unique public and private keys) and the cryptocurrency portfolio (e.g., at least one cryptocurrency type and a number of units for each type) for some users in the plurality of users. However, the cost basis data for each hardware wallet may be stored in parallel, in cryptocurrency wallet database 145 in an associated wallet file 150.

In some embodiments, secondary accounts database 155 may include a plurality of user accounts 160 for each of n users denoted user1, user2, . . . and usern. Each user account 160 may be used to store tax payment information for every purchase transaction by a user using cryptocurrency stored in respective user cryptocurrency wallet 150.

In some embodiments, user 175 may desire to perform a purchase transaction with a merchant. User 175 may be located, for example, in a store of the merchant, finds merchandise to buy, and goes to checkout counter with POS terminal 165. User 175 may scan the items into POS terminal 165. Alternatively, the agent may scan the merchandise at the checkout counter into POS terminal 165. After recording the items for sale in POS terminal 165 in a fiat currency, such as U.S. dollars, for example, the agent may ask user 175 how the user wishes to pay for the merchandise. The user may indicate to the agent that he wishes to pay using cryptocurrency.

In some embodiments, a cryptocurrency wallet management application running on user device 185 (e.g., a processor of user device 185) may use a graphical user interface (GUI) 180 to display cryptocurrency transaction information on a screen of user device 185. Processor 110 through GUI purchase manager module 120 may remotely control user device 185 over communication network 170 and control the cryptocurrency transaction information displayed on GUI 180. In other embodiments, cryptocurrency wallet management module 112 may be executed by a local processor on user device 185, but still communicates, in part with the cryptocurrency wallets in memory 140.

In some embodiments, the fiat currency type may be country or region-dependent. In some embodiments, the fiat currency may be detected from the user's location (e.g., location of user device 185) automatically by location tracking, such as using global positioning systems (GPS), for example. In other embodiments, the fiat currency may be preset in the application by the user.

In some embodiments, when the user may indicate to the POS terminal and/or to an agent that the payment is to be in cryptocurrency, a barcode such as a QR code 167 may then be displayed on a display of POS terminal 165 with information about the purchase transaction. User 175 may use a barcode application (e.g., QR scan application) or a scan function in the cryptocurrency wallet management application running on user device 185 to initiate communication with cryptocurrency wallet management module 112 on server computer 105.

In some embodiments, user 175 may use an imaging device such as a camera running on user device 185 to scan the barcode which causes the processor on user device 185 through the cryptocurrency wallet management application to display the purchase price of the items in fiat currency and the name of the merchant on graphical user interface (GUI) 180.

In some embodiments, user device 185 may pair 186 with POS terminal 165 using Bluetooth, for example, which causes the processor on user device 185 through the cryptocurrency wallet management application to display the purchase price of the items in fiat currency and the name of the merchant on graphical user interface (GUI) 180.

In some embodiments, user 175 may operate a webpage displaying the merchandise of the merchant either locally in the merchant's store or remotely at home. After checkout, user 175 may click on a link 172 on the display of computer terminal 171, which causes the processor (e.g., through cloud computing, for example) on user device 185 through the cryptocurrency wallet management application to display the purchase price of the items in fiat currency and the name of the merchant on graphical user interface (GUI) 180.

Cryptocurrency wallet management module 112 and/or GUI purchase manager module 120 may then cause the cryptocurrency portfolio held in a wallet 150 of user 175 to be displayed on GUI 180 via communication network 170. In various embodiments, GUI 180 may allow user 175 to view the purchase price in the fiat currency and in all of the available cryptocurrencies held in wallet 150. Representative exchange rates from online databases may be used for converting purchase price in fiat currency for all of the available cryptocurrencies held in wallet 150 to a purchase transaction-related number of cryptocurrency units.

Cost basis module 116 and tax computation module 118 may then be used to cause GUI 180 to display an estimated tax payment amount value due for each of the available cryptocurrencies held in wallet 150 to pay for the purchase transaction. In some embodiments, tax computation module 118 may apply representative exchange rates from online databases for converting purchase price in fiat currency for each cryptocurrency to a purchase transaction-related number of cryptocurrency units. In other embodiments, best cryptocurrency exchange module 114 may query multiple cryptocurrency exchanges 156 to receive the best cryptocurrency exchange rates for each of the cryptocurrency types held in wallet 150 of user 175 for tax computation module 118 to compute a more accurate estimate tax payment amount value due using each of the possible cryptocurrencies in the user's wallet.

User 175 may then choose, using GUI 180, which cryptocurrency to use to pay for the purchase transaction. User 175 may also choose whether to add additional cryptocurrency funds to the purchase transaction to cover the tax payment amount value due to the tax authority. Processor 110 using best cryptocurrency exchange module 114 may communicate in real-time with multiple cryptocurrency exchange servers 157 of multiple cryptocurrency exchanges 156 to identify which cryptocurrency exchange has the best cryptocurrency exchange rate. Cryptocurrency wallet management module 112 may then compute a cryptocurrency purchase amount based on the fiat purchase amount of the purchase transaction and the best cryptocurrency exchange rate.

In some embodiments, cryptocurrency wallet management module 112 on server computer 105 (e.g., backend server) may compute a purchase transaction-related number of cryptocurrency units of the chosen cryptocurrency from the fiat currency amount. Cryptocurrency wallet management module 112 may deduct the number of cryptocurrency units from wallet 150 of user 175 needed to pay for the purchase transaction, and may communicate 135 or relay the deducted cryptocurrency along with the user's digital credentials associated with the user's cryptocurrency wallet to the identified cryptocurrency exchange with the best cryptocurrency exchange rate. In response, the identified cryptocurrency exchange may exchange the purchase transaction-related number of cryptocurrency units of the chosen cryptocurrency to fiat currency and may relay the exchanged fiat currency to server computer 105.

In some embodiments, user 175 may decide to sell one or multiple cryptocurrencies held in wallet 150 in a batch to pay for the purchase transaction in the fiat currency immediately or over a short time period.

In some embodiments, upon receipt of the fiat currency, cryptocurrency wallet management module 112 may send a confirmation to user device 175, POS terminal 165, and the merchant (e.g., to merchant server 168) that the transaction was executed. Cryptocurrency wallet management module 112 and/or tax computation and reporting module 118 may split the received fiat currency. A first part of the received fiat currency may be sent over a payment gateway to pay the merchant (e.g., transfer the first part to an account of the merchant), and a second part may be transferred to secondary account 160 associated with user 175 to pay the tax payment amount value due to the tax authority for the cryptocurrency-based purchase transaction.

In some embodiments, a third portion of the received fiat currency may be sent to a gateway account (e.g., a gateway service fee) of the financial institution or entity for the use of the service. The service fee may be used to fund rewards for customers similar to credit card points, for example.

FIG. 2A depicts a first exemplary graphic user interface 200 for managing a cryptocurrency storage request, in accordance with one or more embodiments of the present disclosure. GUI 200 may be controlled by cost basis tracking module 116. GUI 200 may be displayed on the display of user device 180 of user 175 for managing deposits of cryptocurrency into wallet 150 of user 175. GUI 200 may be displayed on a private computer of user 175 with an application running thereon for communicating with cryptocurrency wallet management module 112 and/or cost basis tracking module 116. The embodiments for computing the tax payment amount value to pay for the tax due from paying the purchase transaction in the chosen cryptocurrency held in wallet 150 depends on the accurate cost basis tracking of the stored cryptocurrency.

In some embodiments, to ensure accurate cost basis tracking of each cryptocurrency deposit stored in the wallet, GUI 200 may request that the user enter the cost basis data prior to receiving the cryptocurrency for storage. GUI 200 may prompt the user to enter the cryptocurrency type 202, a number 204 of cryptocurrency units, a date 206 the cryptocurrency was purchased with fiat currency, a fiat currency 210, and a value 208 of the purchase of the cryptocurrency in fiat currency 210. In other embodiments, a second embodiment of GUI 200 (not shown) may manage the case where the cryptocurrency was transferred to the user, but not purchased directly from fiat currency. In this case, GUI 200 may request the date of receipt of the cryptocurrency from the sender, the reasons for exchange of the cryptocurrency, and any needed historical exchange rate data may be queried from cryptocurrency databases to establish a cost basis relative to a desired fiat currency.

In some embodiments, the cost basis data may already be known by server 105 if the purchase was made previously through the same app running on user device 180 communicatively coupled 135 to server 105.

In some embodiments, the cost basis data may be retrieved from cryptocurrency exchange 156 that performed the purchase transaction of fiat currency, FIG. 2B depicts a second exemplary graphic user interface 215 for managing a cryptocurrency storage request, in accordance with one or more embodiments of the present disclosure. Once this cost basis information is entered into GUI 200, cost basis tracking module 116 may approve the request to receive the cryptocurrency transfer for storage in wallet 150 of user 175. A GUI 215 may be displayed on user device 185 or on a private computer of user 175 also indicates a public key 220 of wallet 150 of user 175 to relay to the sender. In some embodiments, cryptocurrency wallet management module 112 may automatically relay the digital credentials to the sender to send the cryptocurrency for storage in wallet 150 of user 175.

In some embodiments, if the user does not provide adequate cost basis information, cost basis tracking module 116 may reject the request by not relaying the user's digital credentials associated with the user's cryptocurrency wallet. In other embodiments, if the cost basis information is determined not to be accurate, cryptocurrency wallet management module 112 may block the use of the cryptocurrency held in the wallet for merchant purchases as previously described until proper cost basis tracking is restored by the user supplying the necessary information to cryptocurrency wallet management module 112.

FIGS. 3A-3C depict exemplary views 225 of graphic user interface (GUI) 180 on a screen of user device 185 during a purchase transaction, in accordance with one or more embodiments of the present disclosure.

FIG. 3A depicts a first exemplary view of cryptocurrency transaction graphic user interface (GUI) 180 on a screen of user device 185, in accordance with one or more embodiments of the present disclosure. When user 175 uses the imaging device of user device 185 to scan QR barcode 167 during checkout, graphic user interface (GUI) module 120 causes user device 185 to display a cost 130 of the purchase in fiat currency, and a cryptocurrency portfolio with the number of units each cryptocurrency 235 (Bitcoin BTC, Ethereum ETH, and Ripple XRP) and the value of each cryptocurrency in the fiat currency 240. GUI 180 then asks the user as to which cryptocurrency to use to pay the purchase transaction to the merchant and the user may choose the cryptocurrency on a pulldown menu 245.

FIG. 3B depicts a second exemplary view of graphic user interface (GUI) 180 on a screen of user device 185, in accordance with one or more embodiments of the present disclosure. Upon choosing the cryptocurrency, GUI 180 prompts the user as to the purchase price 250 in the chosen cryptocurrency. Tax computation and reporting module 118 then computes the tax payment amount due 255 in the fiat currency which may be displayed on GUI 180. GUI 180 may prompt the user whether to add the tax payment due to the total cryptocurrency transaction, which the user chooses from a pull-down menu 260. Finally, GUI 180 prompts the user to approve the total transaction amount by clicking YES or NO buttons 265.

FIG. 3C depicts a third exemplary view of graphic user interface (GUI) 180 on a screen of user device 185, in accordance with one or more embodiments of the present disclosure. Upon approving the transaction, the cryptocurrency may be sold on the cryptocurrency exchange offering the best exchange rate 270 for bitcoins (BTC). GUI 180 may then report that the transaction was completed successfully. GUI 180 may display that COINBASE provided the best execution price, the number of bitcoins 275 deduct from wallet 150 of user 175, the amount in fiat currency transferred to merchant with a transaction timestamp 277, the amount of taxes paid on the transaction 280, and the total taxes held in secondary account 160 as of the current transaction. In some embodiments, other data may be displayed such as a transaction ID number.

The different menu views shown in FIGS. 2A-2B for obtaining the cost basis of the cryptocurrency and FIGS. 3A-3C illustrating the menu views on GUI 180 during the conversion of cryptocurrency to fiat currency to pay the merchant and/or tax payment amount due are merely for conceptual and visual clarity and not by way of limitation of the embodiments taught herein.

FIG. 4 illustrates a flowchart of a first exemplary method 290 for managing cryptocurrency wallets having cost basis tracking and uses thereof, in accordance with one or more embodiments of the present disclosure. Method 290 may be performed by processor 110 of server computer 105.

Method 290 may include receiving 291 a plurality of cryptocurrency storage requests to send cryptocurrency for storage in a plurality of cryptocurrency wallets associated with a plurality of respective users.

Method 290 may include accepting 292 the cryptocurrency for storage in each cryptocurrency storage request from the plurality of cryptocurrency storage requests when a unit cost basis value is computed for each cryptocurrency unit in a fiat currency for each cryptocurrency storage request from the plurality of cryptocurrency storage requests.

Method 290 may include receiving 293 a purchase request from at least one user from the plurality of users to perform a purchase transaction with a merchant to be paid in a cryptocurrency chosen by the at least one user of the plurality of users.

Method 290 may include communicating 294 in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency.

Method 290 may include receiving 295 a payment acceptance from the at least one user for the purchase transaction to be paid in the chosen cryptocurrency at the best cryptocurrency exchange rate and a cryptocurrency-based tax payment amount in the fiat currency due when converting the chosen cryptocurrency to the fiat currency to pay for the purchase transaction.

Method 290 may include transferring 296 a purchase transaction-related number of cryptocurrency units in the chosen cryptocurrency from the cryptocurrency wallet of the at least one user to the identified cryptocurrency exchange in response to the payment acceptance.

Method 290 may include receiving 297 the fiat currency converted in the identified cryptocurrency exchange from the purchase transaction-related number of cryptocurrency units in the chosen cryptocurrency.

Method 290 may include transferring 298 the cryptocurrency-based tax payment amount in the fiat currency to a secondary account of the at least one user, and the cryptocurrency-based payment of the purchase transaction in the fiat currency to an account of the merchant.

Figure 5:
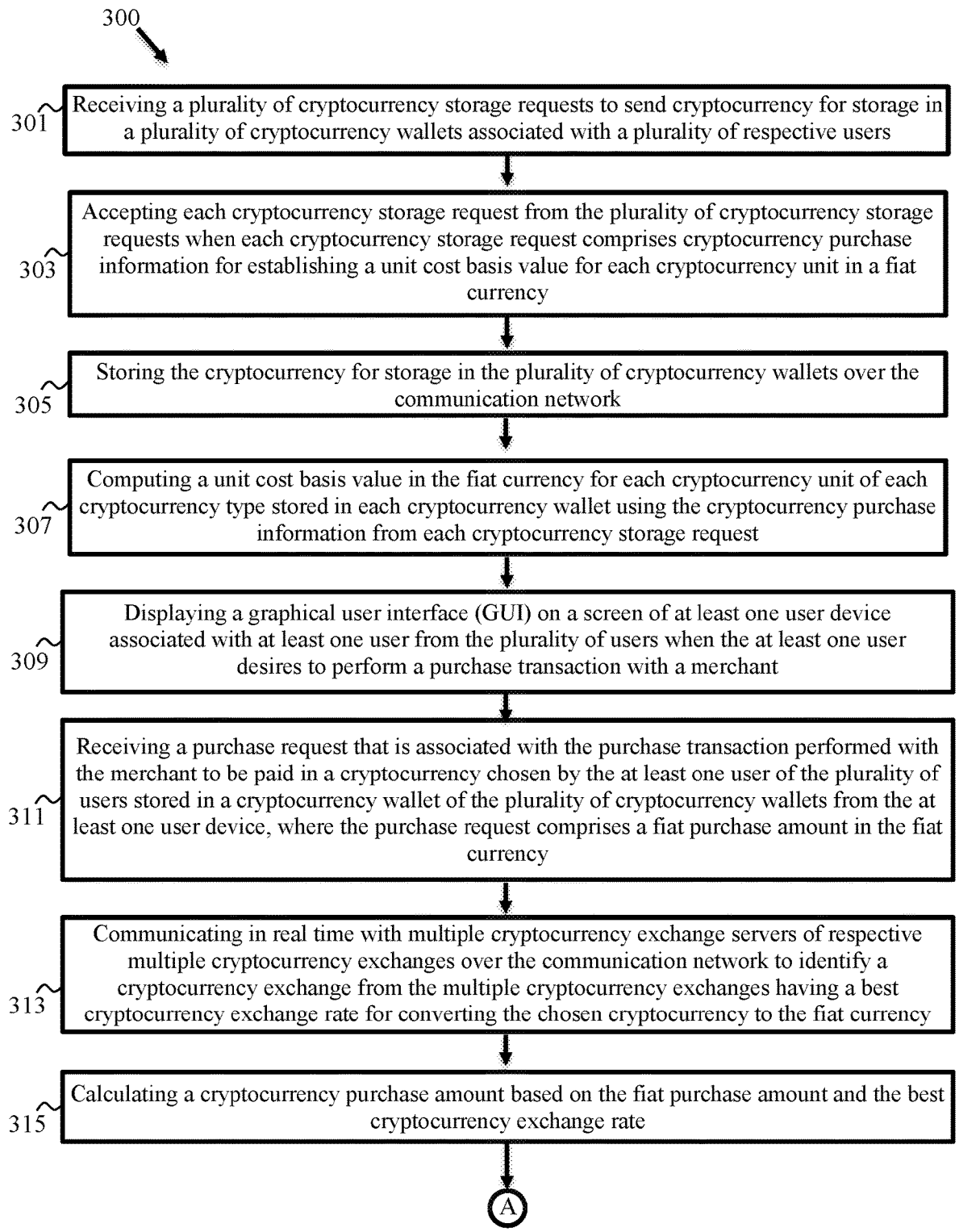
FIG. 5 illustrates a flowchart of a second exemplary method for managing cryptocurrency wallets having cost basis tracking and uses thereof, in accordance with one or more embodiments of the present disclosure.
Figure 5:
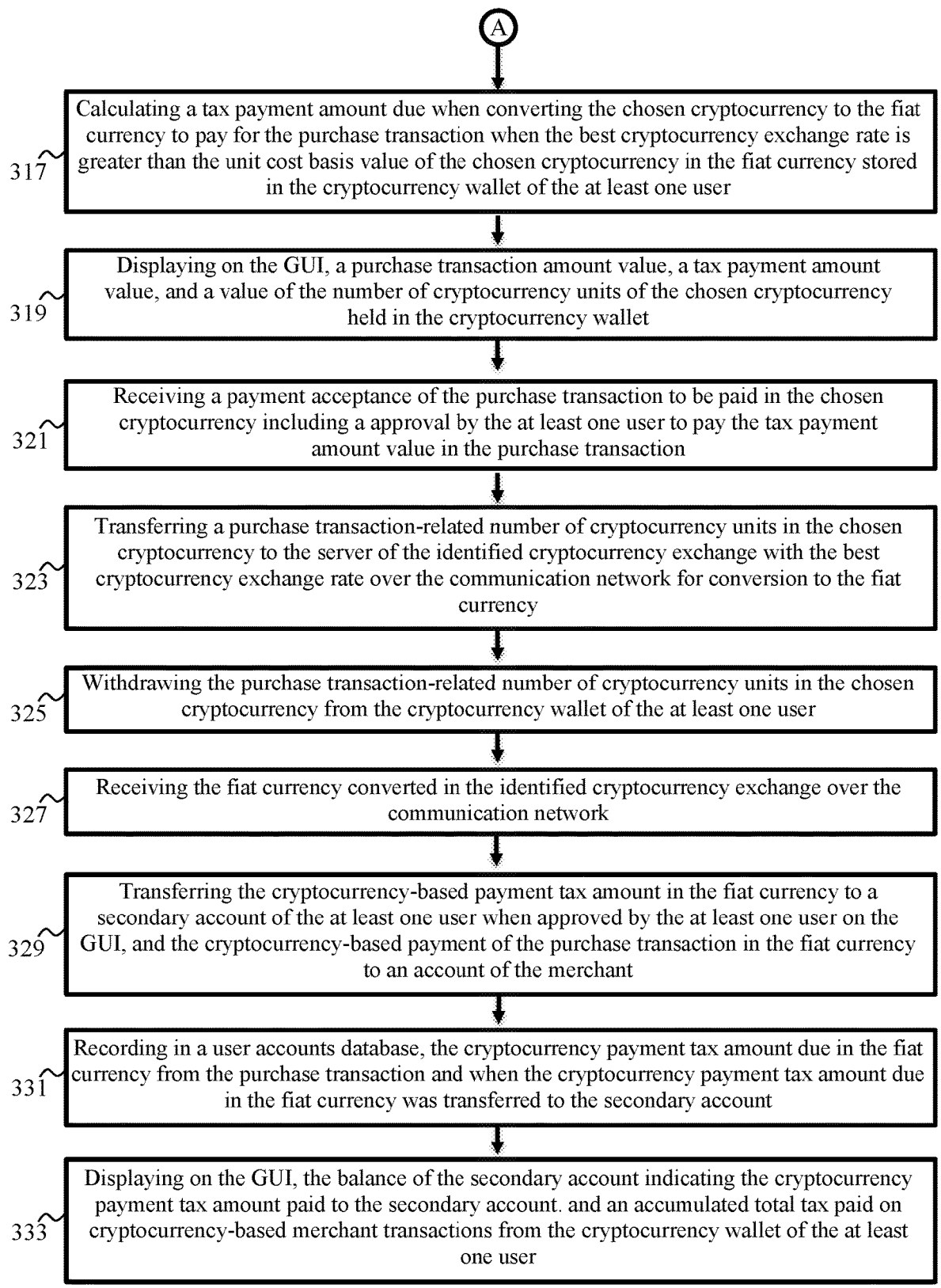

FIG. 5 illustrates a flowchart of a second exemplary method 300 for managing cryptocurrency wallets having cost basis tracking, in accordance with one or more embodiments of the present disclosure. Method 300 may be performed by processor 110 of server computer 105.

Method 300 may include receiving 301 a plurality of cryptocurrency storage requests to send cryptocurrency for storage in a plurality of cryptocurrency wallets associated with a plurality of respective users.

Method 300 may include accepting 303 each cryptocurrency storage request from the plurality of cryptocurrency storage requests when each cryptocurrency storage request may include cryptocurrency purchase information for establishing a unit cost basis value for each cryptocurrency unit in a fiat currency.

Method 300 may include storing 305 the cryptocurrency for storage in the plurality of cryptocurrency wallets over the communication network.

Method 300 may include computing 307 a unit cost basis value in the fiat currency for each cryptocurrency unit of each cryptocurrency type stored in each cryptocurrency wallet using the cryptocurrency purchase information from each cryptocurrency storage request.

Method 300 may include displaying 309 a graphical user interface (GUI) on a screen of at least one user device associated with at least one user from the plurality of users when the at least one user desires to perform a purchase transaction with a merchant. GUI 180 may display successive windows during the purchase transaction as shown in exemplary views 225 in FIGS. 3A-3C.

Method 300 may include receiving 311 a purchase request that is associated with the purchase transaction performed with the merchant to be paid in a cryptocurrency chosen by the at least one user of the plurality of users stored in a cryptocurrency wallet of the plurality of cryptocurrency wallets from the at least one user device, where the purchase request may include a fiat purchase amount in the fiat currency.

Method 300 may include communicating 313 in real-time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency.

Method 300 may include calculating 315 a cryptocurrency purchase amount based on the fiat purchase amount and the best cryptocurrency exchange rate.

Method 300 may include calculating 317 a tax payment amount due when converting the chosen cryptocurrency to the fiat currency to pay for the purchase transaction when the best cryptocurrency exchange rate is greater than the unit cost basis value of the chosen cryptocurrency in the fiat currency stored in the cryptocurrency wallet of the at least one user.

Method 300 may include displaying 319 on the GUI, a purchase transaction amount value, a tax payment amount value, and a value of the number of cryptocurrency units of the chosen cryptocurrency held in the cryptocurrency wallet as shown in FIG. 3B.

Method 300 may include receiving 321 a payment acceptance of the purchase transaction to be paid in the chosen cryptocurrency (e.g., YES button 265) including an approval by the at least one user to pay the tax payment amount value in the purchase transaction (e.g., YES button 260).

Method 300 may include transferring 323 a purchase transaction-related number of cryptocurrency units in the chosen cryptocurrency to the server of the identified cryptocurrency exchange with the best cryptocurrency exchange rate over the communication network for conversion to the fiat currency.

Method 300 may include withdrawing 325 the purchase transaction-related number of cryptocurrency units in the chosen cryptocurrency from the cryptocurrency wallet of the at least one user.

Method 300 may include receiving 327 the fiat currency converted in the identified cryptocurrency exchange over the communication network.

Method 300 may include transferring 329 the cryptocurrency-based payment tax amount in the fiat currency to a secondary account of the at least one user when approved by the at least one user on the GUI, and the cryptocurrency-based payment of the purchase transaction in the fiat currency to an account of the merchant.

Method 300 may include recording 331 in a user accounts database, the cryptocurrency payment tax amount due in the fiat currency from the purchase transaction and when the cryptocurrency payment tax amount due in the fiat currency was transferred to the secondary account.

Method 300 may include displaying 333 on the GUI, balance of the secondary account 280 indicating the cryptocurrency payment tax amount paid to the secondary account, and an accumulated total tax paid 285 on cryptocurrency-based merchant transactions from the cryptocurrency wallet of the at least one user as shown in FIG. 3C.

Figure 6:
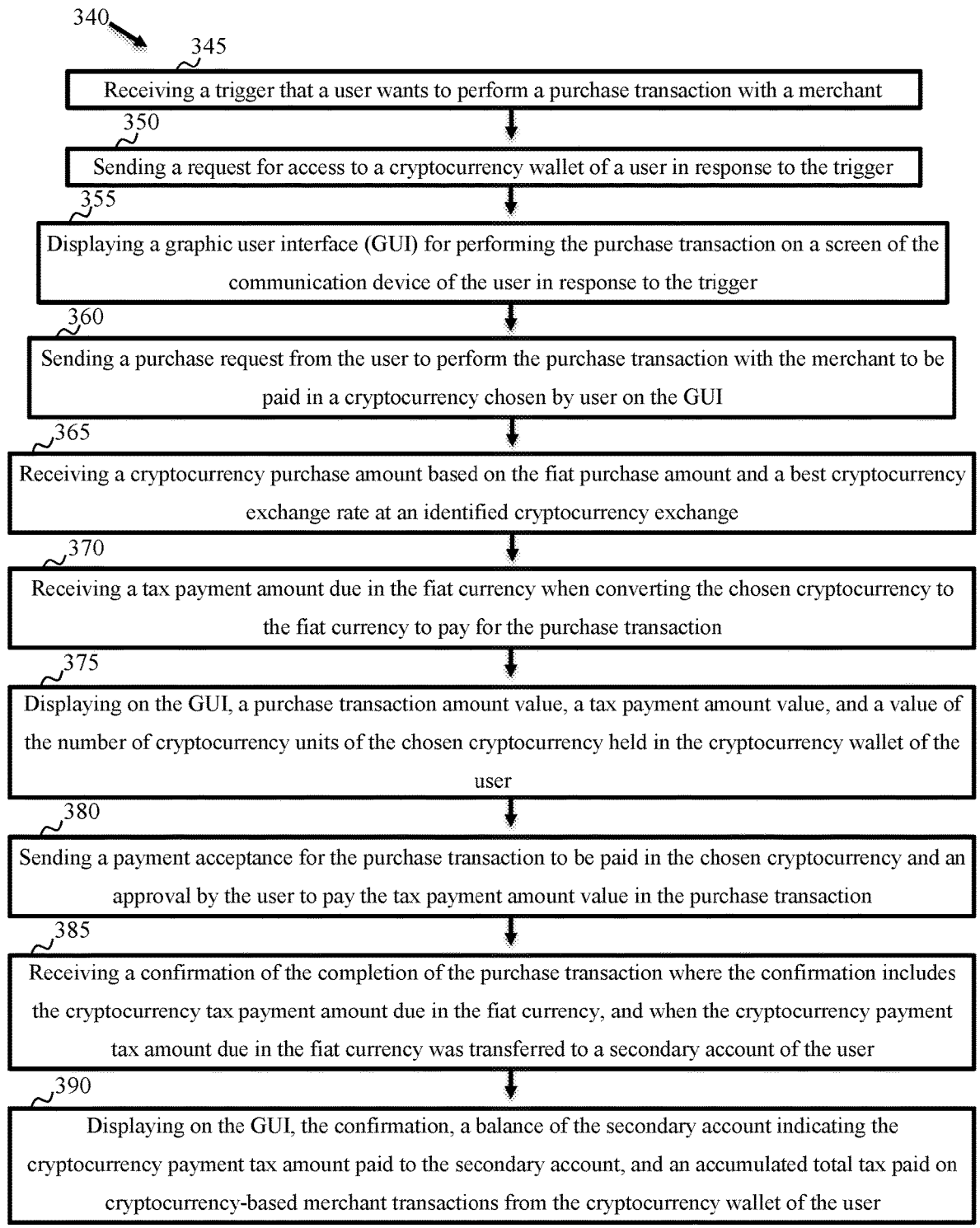
FIG. 6 illustrates a flowchart of an exemplary method to pay for merchant transactions using cryptocurrency and uses thereof, in accordance with one or more embodiments of the present disclosure.

FIG. 6 illustrates a flowchart of an exemplary method 340 to pay for merchant transactions using cryptocurrency and uses thereof, in accordance with one or more embodiments of the present disclosure. Method 340 may be performed by a processor of user device 185.

Method 340 may include receiving 345 a trigger that a user wants to perform a purchase transaction with a merchant.

Method 340 may include sending 350 a request for access to a cryptocurrency wallet of a user in response to the trigger.

Method 340 may include displaying 355 a graphic user interface (GUI) for performing the purchase transaction on a screen of the communication device of the user in response to the trigger.

Method 340 may include sending 360 a purchase request from the user to perform the purchase transaction with the merchant to be paid in a cryptocurrency chosen by user on the GUI.

Method 340 may include receiving 365 a cryptocurrency purchase amount based on the fiat purchase amount and a best cryptocurrency exchange rate at an identified cryptocurrency exchange.

Method 340 may include receiving 370 a tax payment amount due in the fiat currency when converting the chosen cryptocurrency to the fiat currency to pay for the purchase transaction.

Method 340 may include displaying 375 on GUI 180, purchase transaction amount value 250, tax payment amount value 255, and value 240 of the number of cryptocurrency units of the chosen cryptocurrency held in the cryptocurrency wallet of the user as shown in FIGS. 3A-3C.

Method 340 may include sending 380 a payment acceptance (YES Button 265) for the purchase transaction to be paid in the chosen cryptocurrency and an approval by the user to pay the tax payment amount value in the purchase transaction (YES button 260).

Method 340 may include receiving 385 confirmation 270 of the completion of the purchase transaction where the confirmation includes cryptocurrency tax payment amount due in the fiat currency 280, and when (e.g., time 277) the cryptocurrency payment tax amount due in the fiat currency was transferred to a secondary account of the user.

Method 340 may include displaying 390 on the GUI, confirmation 270, a balance of the secondary account indicating the cryptocurrency payment tax amount paid to the secondary account 280, and accumulated total tax paid 285 on cryptocurrency-based merchant transactions from the cryptocurrency wallet of the user.

Figure 7:
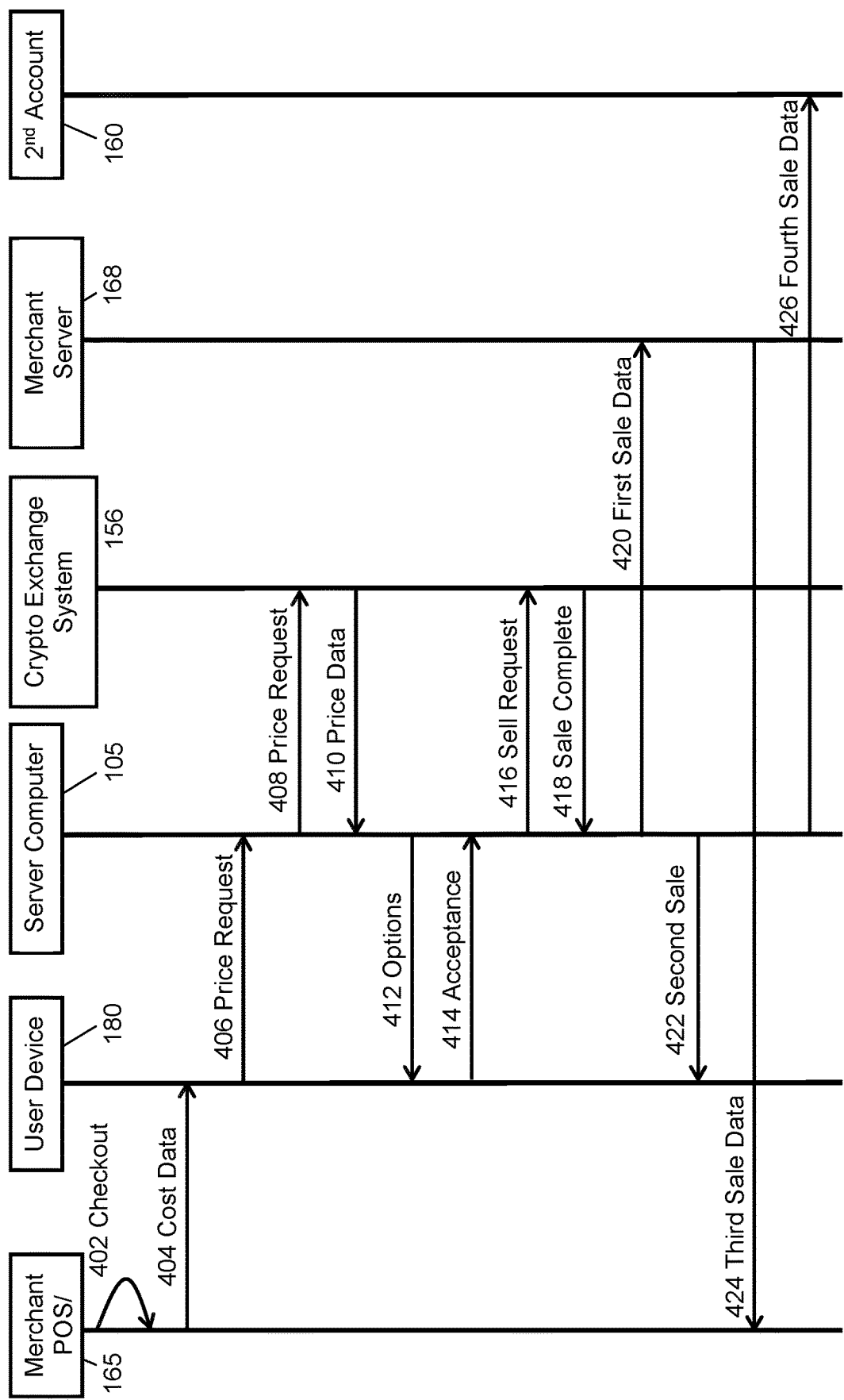
FIG. 7 depicts an exemplary sequencing diagram for managing cryptocurrency wallets having cost basis tracking and uses thereof, in accordance with one or more embodiments of the present disclosure.

FIG. 7 depicts an exemplary sequencing diagram 400 for managing cryptocurrency wallets having cost basis tracking and uses thereof, in accordance with one or more embodiments of the present disclosure. User 175 may scan items at POS terminal 165. User 175 may initiate a checkout 402 at POS terminal 165 and may indicate payment by cryptocurrency on GUI 180. A display of POS terminal 165 displays a QR code 167, which may be scanned using an imaging device, such as a camera, in user device 185. User device 185 may receive cost data 404, such as the amount of the purchase transaction in fiat currency (e.g., U.S. Dollar) and a transaction ID number upon scanning QR code 167.

In some embodiments, user device 185 may relay a price request 406 to the backend server (e.g., server computer 105). Server computer 105 may query 408 multiple cryptocurrency exchanges 156 in real-time, may receive exchange rate data 410 for the multiple cryptocurrencies held by user 175 in wallet 150, and may identify the cryptocurrency exchange with the best exchange rates. Tax computation module 118 and cost basis tracking module may compute the tax payment amount due for the multiple cryptocurrencies held by user 175 in wallet 150 based on the cost basis data, which may display options 412 on user device 180 for user 175 to choose as shown in FIG. 3A.

When user 175 chooses a cryptocurrency from a list of options 412 and accepts 414 the transaction, a sell request 416 may be relayed to identified cryptocurrency exchange 156 having the best exchange rate. Sell request 416 may include in part, the number of cryptocurrency units in the chosen cryptocurrency, the fiat currency amount of the purchase transaction, and the transactionID, as well as the digital credentials associated with wallet 150 of user 175. The identified cryptocurrency exchange may convert the cryptocurrency units in the chosen cryptocurrency to the fiat currency. Cryptocurrency exchange 156 may relay a sale complete notification 418 to server computer 105 that transaction was completed.

In some embodiments, server computer 168 may relay a first sale data notification 420 to merchant server 168 with the transactionID from the sale and that the payment to cover the purchase transaction was transferred to the merchant account. Server computer 168 may relay a second sale data notification 422 for display on the user device 180 that the sale was complete as shown in FIG. 3C. Merchant server 168 may relay a third sale data notification 422 for display on POS terminal 165 that the transaction was completed including the transactionID. Server computer 168 may relay a fourth sale data notification 426 to with user accounts 160 associated with user 185 in secondary accounts database 155 that the transaction was completed.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 8:
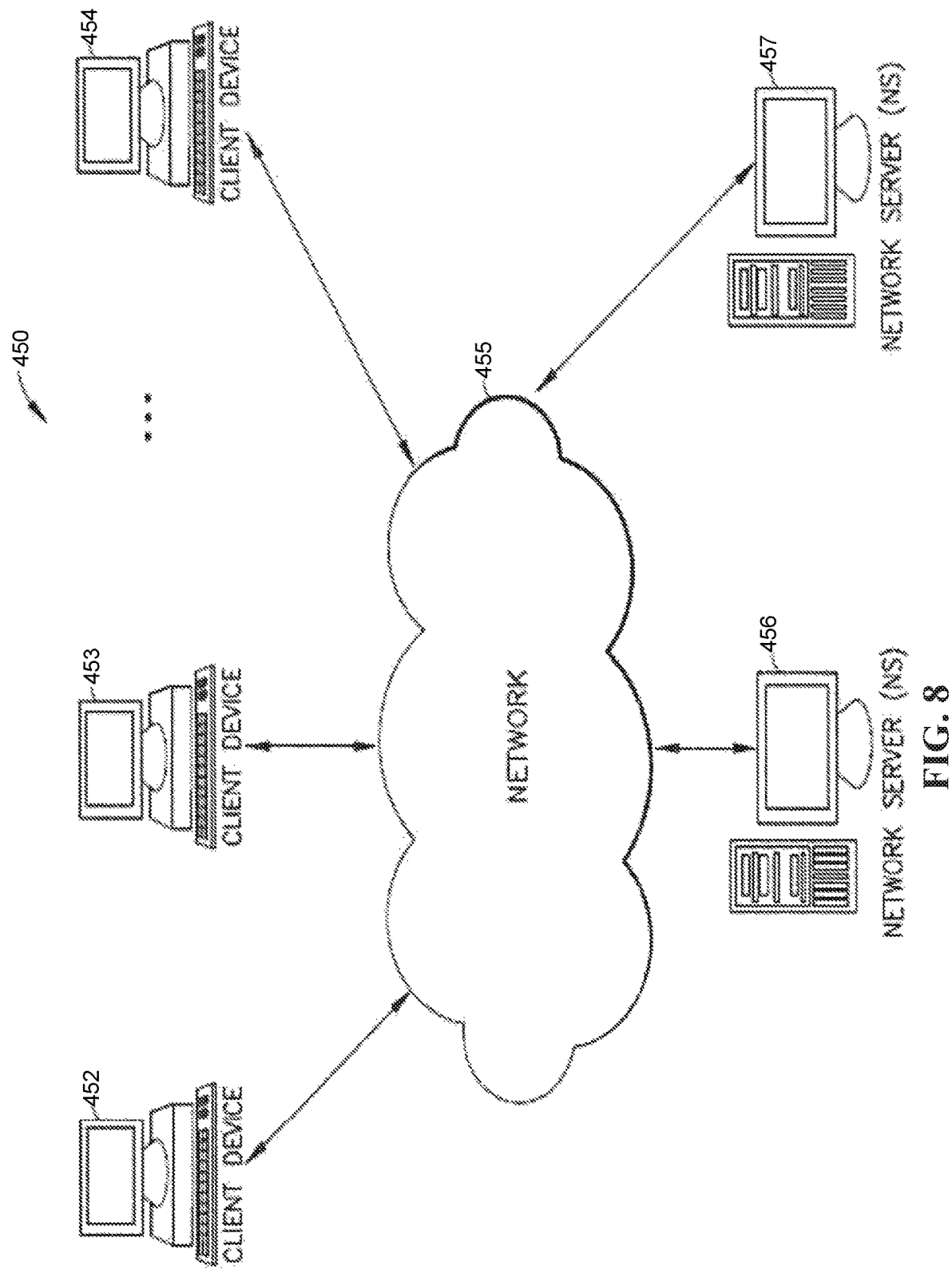
FIG. 8 depicts a block diagram of an exemplary computer-based system/platform, in accordance with one or more embodiments of the present disclosure.

FIG. 8 depicts a block diagram of an exemplary computer-based system/platform 450 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 450 may be configured to manage a large number of members and/or concurrent transactions, as detailed herein. In some embodiments, the exemplary computer-based system/platform 450 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 452-454 (e.g., clients) of the exemplary computer-based system/platform 450 may include virtually any computing device capable of receiving and sending a message over a network (e.g., cloud network), such as network 455, to and from another computing device, such as servers 456 and 457, each other, and the like. In some embodiments, the member devices 452-454 may be personal computers, multiprocessor systems, microprocessor-based or programmable consumer electronics, network PCs, and the like. In some embodiments, one or more member devices within member devices 452-454 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 452-454 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 452-454 may include may run one or more applications, such as Internet browsers, mobile applications, voice calls, video games, videoconferencing, and email, among others. In some embodiments, one or more member devices within member devices 452-454 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 452-454 may be specifically programmed by either Java, .Net, QT, C, C++ and/or other suitable programming language. In some embodiments, one or more member devices within member devices 452-454 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 455 may provide network access, data transport and/or other services to any computing device coupled to it. In some embodiments, the exemplary network 455 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 455 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 455 may include and implement, as an alternative or in conjunction with one or more of the above, a WiMAX architecture defined by the WiMAX forum. In some embodiments and, optionally, in combination of any embodiment described above or below, the exemplary network 455 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 455 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 455 may also include mass storage, such as network attached storage (NAS), a storage area network (SAN), a content delivery network (CDN) or other forms of computer or machine readable media.

In some embodiments, the exemplary server 456 or the exemplary server 457 may be a web server (or a series of servers) running a network operating system, examples of which may include but are not limited to Microsoft Windows Server, Novell NetWare, or Linux. In some embodiments, the exemplary server 456 or the exemplary server 457 may be used for and/or provide cloud and/or network computing. Although not shown in FIG. 7, in some embodiments, the exemplary server 456 or the exemplary server 457 may have connections to external systems like email, SMS messaging, text messaging, ad content providers, etc. Any of the features of the exemplary server 456 may be also implemented in the exemplary server 457 and vice versa.

In some embodiments, one or more of the exemplary servers 456 and 457 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 451-454.

In some embodiments and, optionally, in combination of any embodiment described above or below, for example, one or more exemplary computing member devices 452-454, the exemplary server 456, and/or the exemplary server 457 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 9:
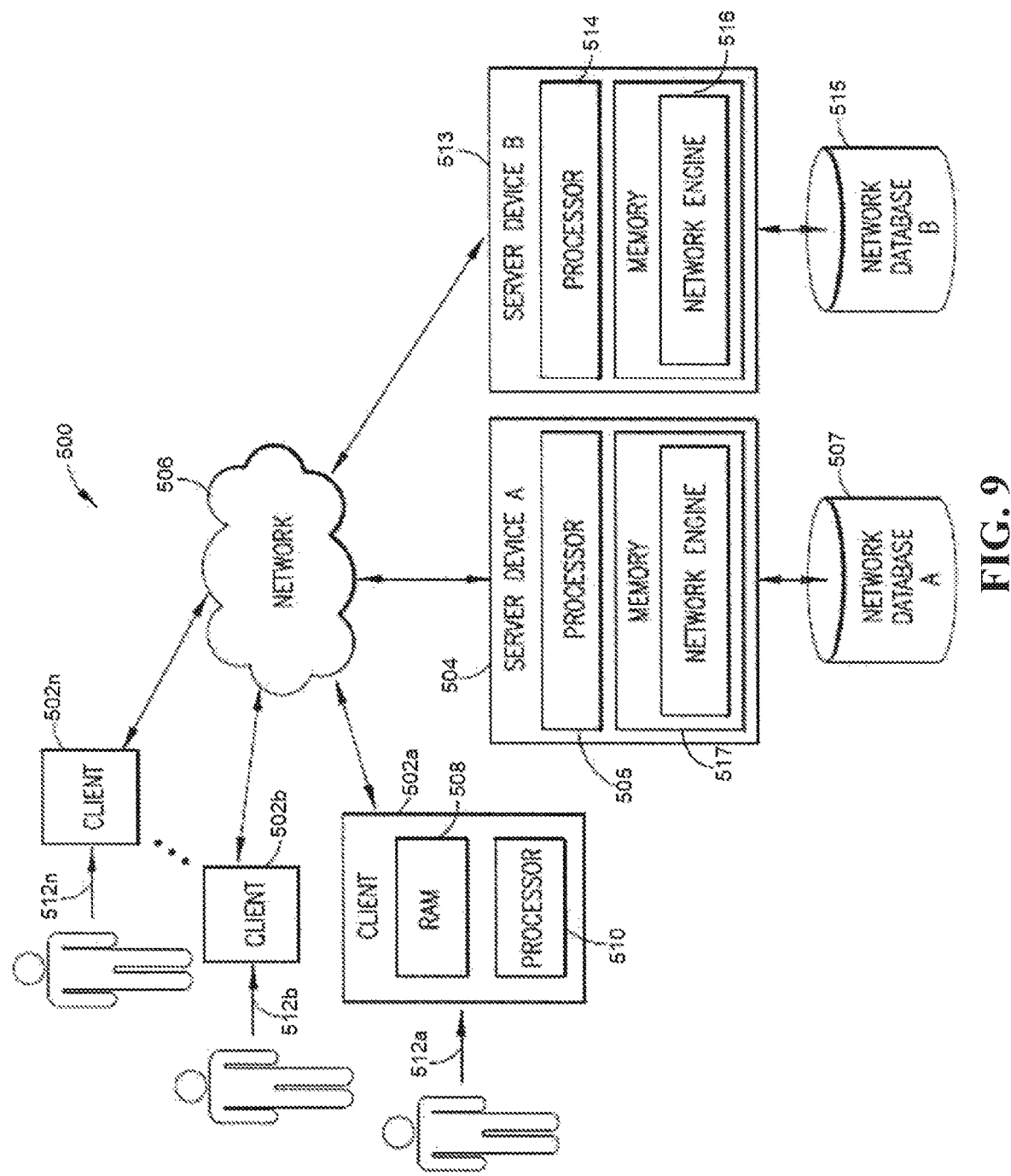
FIG. 9 depicts a block diagram of another exemplary computer-based system/platform, in accordance with one or more embodiments of the present disclosure.

FIG. 9 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 502a through 502n may also include a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users 512a through 512n may communicate over the exemplary network 506 with each other and/or with other systems and/or devices coupled to the network 506. As shown in FIG. 9, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
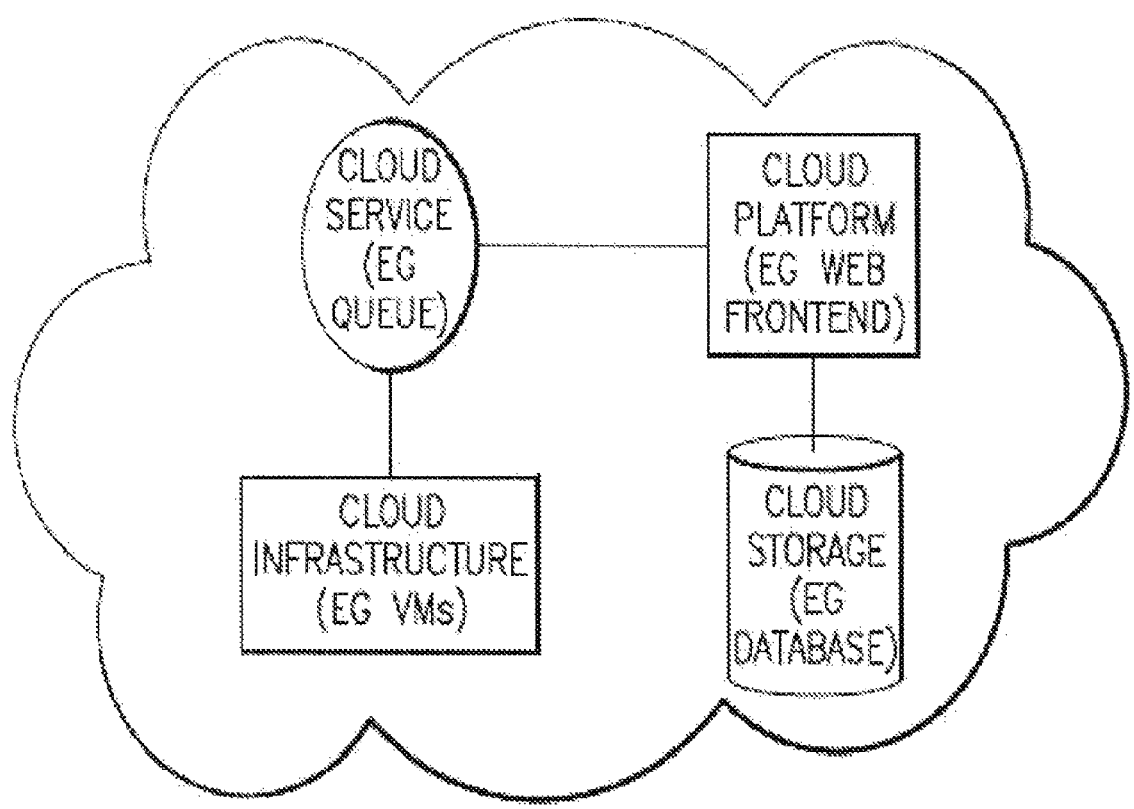
FIGS. 10 and 11 are diagrams illustrating implementations of cloud computing architecture/aspects with respect to which the disclosed technology may be specifically configured to operate, in accordance with one or more embodiments of the present disclosure.
Figure 11:
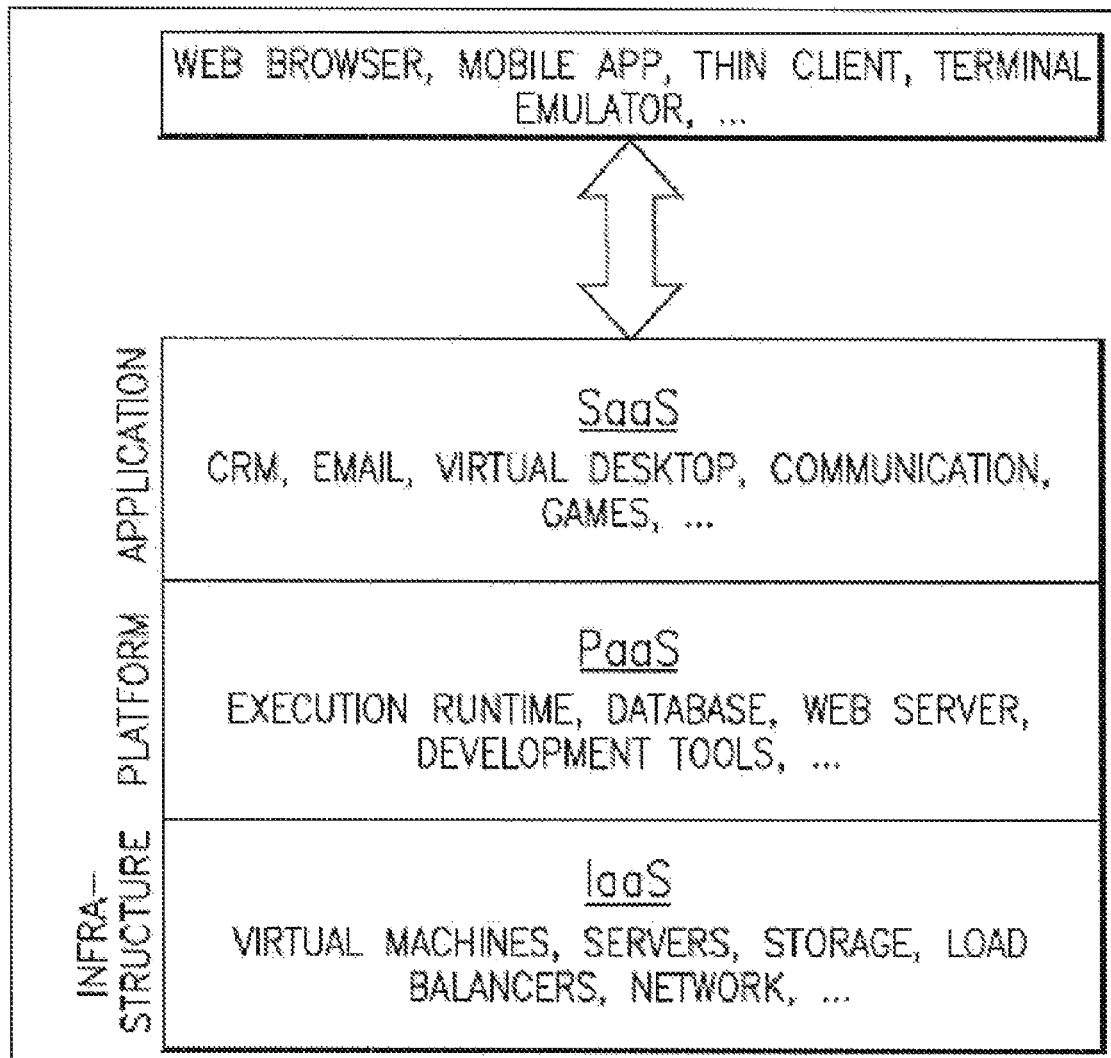

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databases such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, a method may include:

receiving, by a server computer communicatively coupled to a communication network, a plurality of cryptocurrency storage requests to send cryptocurrency for storage in a plurality of cryptocurrency wallets associated with a plurality of respective users;

wherein each respective cryptocurrency wallet may be managed by the server computer;

accepting, by the server computer, the cryptocurrency for storage in each cryptocurrency storage request from the plurality of cryptocurrency storage requests when a unit cost basis value is computed for each cryptocurrency unit in a fiat currency for each cryptocurrency storage request from the plurality of cryptocurrency storage requests;

receiving, by the server computer, a purchase request from at least one user from the plurality of users to perform a purchase transaction with a merchant to be paid in a cryptocurrency chosen by the at least one user of the plurality of users;

wherein the chosen cryptocurrency may be stored in the cryptocurrency wallet of the at least one user;

wherein the purchase request may include a fiat purchase amount in the fiat currency;

communicating, by the server computer, in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency;

receiving, by the server computer, a payment acceptance from the at least one user for the purchase transaction to be paid in the chosen cryptocurrency at the best cryptocurrency exchange rate and a cryptocurrency-based tax payment amount in the fiat currency due when converting the chosen cryptocurrency to the fiat currency to pay for the purchase transaction;

transferring, by the server computer, a purchase transaction-related number of cryptocurrency units in the chosen cryptocurrency from the cryptocurrency wallet of the at least one user to the identified cryptocurrency exchange in response to the payment acceptance;

receiving, by the server computer, the fiat currency converted in the identified cryptocurrency exchange from the purchase transaction-related number of cryptocurrency units in the chosen cryptocurrency; and transferring, by the server computer, the cryptocurrency-based tax payment amount in the fiat currency to a secondary account of the at least one user, and the cryptocurrency-based payment of the purchase transaction in the fiat currency to an account of the merchant.

In some embodiments, the method may include rejecting, by the server computer, the cryptocurrency for storage in the cryptocurrency storage request from the plurality of cryptocurrency storage requests when the unit cost basis value for each cryptocurrency unit in the cryptocurrency storage request cannot be calculated.

In some embodiments, each cryptocurrency storage request may include cryptocurrency purchase information for calculating the unit cost basis value for each cryptocurrency unit in the fiat currency.

In some embodiments, the cryptocurrency purchase information may include:
  i) at least one cryptocurrency type;
  ii) at least one number of cryptocurrency units for each of the at least one cryptocurrency type;
  iii) at least one acquisition time period for each of the at least one number of cryptocurrency units; and
  iv) at least one exchange rate in the fiat currency at the at least one acquisition time period when acquiring each of the at least one number of cryptocurrency units.

In some embodiments, accepting the cryptocurrency for storage for each respective cryptocurrency storage request from the plurality of cryptocurrency storage requests may include relaying digital credentials for transferring the cryptocurrency for storage into each respective cryptocurrency wallet.

In some embodiments, the method may include storing, by the server computer, the cryptocurrency for storage in the plurality of cryptocurrency wallets in a digital cryptocurrency wallet in a database in a memory of the server computer, in a hardware cryptocurrency wallet coupled to the server computer, or both.

In some embodiments, the method may include:

receiving, by the server computer, a request to initiate communication with at least one user device associated with the at least one user for access to the cryptocurrency wallet of the at least one user when the at least one user device scans a bar code on a screen of a point-of-sale terminal of the merchant or when a link is activated on a webpage of the merchant; and causing, by the server computer, to display a graphic user interface for performing the purchase transaction on a screen of the at least one user device.

In some embodiments, the method may include:

receiving, by the server computer, a request to initiate communication with at least one user device associated with the at least one user for access to the cryptocurrency wallet of the at least one user when the at least one user device scans a bar code on a screen of a point-of-sale terminal of the merchant or when a link is activated on a webpage of the merchant; and causing, by the server computer, to display a graphic user interface for performing the purchase transaction on a screen of the at least one user device.

calculating, by the server computer, the cryptocurrency-based tax payment amount due in the fiat currency when the best cryptocurrency exchange rate is greater than the unit cost basis value of the chosen cryptocurrency stored in the cryptocurrency wallet of the at least one user.

In some embodiments, transferring the purchase transaction-related number of cryptocurrency units in the chosen cryptocurrency to a server of the identified cryptocurrency exchange may include verifying that a number of cryptocurrency units in the chosen cryptocurrency held in the cryptocurrency wallet of the at least one user is greater than the purchase transaction-related number of cryptocurrency units in the chosen cryptocurrency.

In some embodiments, the method may include:

recording, by the server computer, in a user accounts database, the cryptocurrency-based tax payment amount in the fiat currency due from the purchase transaction and when the cryptocurrency-based tax payment amount in the fiat currency was transferred to the secondary account;

causing, by the server computer, to display on a graphic user interface GUI of at least one user device associated with the at least one user, a balance of the secondary account indicating the cryptocurrency-based tax payment amount paid to the secondary account, and an accumulated total tax paid on cryptocurrency-based merchant transactions from the cryptocurrency wallet of the at least one user;

preparing, by the server computer, a report of the cryptocurrency-based merchant transactions from the cryptocurrency wallet of the at least one user and a total payment tax amount due in the fiat currency on the cryptocurrency-based merchant transactions recorded in the user accounts database for a tax preparer; and transferring, by the server computer, the accumulated total tax paid on the cryptocurrency-based merchant transactions from the cryptocurrency wallet of the at least one user held in the secondary account to an account of the tax authority.

A server computer may include a memory and a processor, communicatively coupled to a communication network. The processor may be configured to:

receive a plurality of cryptocurrency storage requests to send cryptocurrency for storage in a plurality of cryptocurrency wallets associated with a plurality of respective users;

wherein each respective cryptocurrency wallet may be managed by the server computer;

accept the cryptocurrency for storage in each cryptocurrency storage request from the plurality of cryptocurrency storage requests when a unit cost basis value is computed for each cryptocurrency unit in a fiat currency for each cryptocurrency storage request from the plurality of cryptocurrency storage requests;

receive a purchase request from at least one user from the plurality of users to perform a purchase transaction with a merchant to be paid in a cryptocurrency chosen by the at least one user of the plurality of users;

wherein the chosen cryptocurrency may be stored in the cryptocurrency wallet of the at least one user;

wherein the purchase request may include a fiat purchase amount in the fiat currency;

communicate in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency;

receive a payment acceptance from the at least one user for the purchase transaction to be paid in the chosen cryptocurrency at the best cryptocurrency exchange rate and a cryptocurrency-based tax payment amount in the fiat currency due when converting the chosen cryptocurrency to the fiat currency to pay for the purchase transaction;

transfer a purchase transaction-related number of cryptocurrency units in the chosen cryptocurrency from the cryptocurrency wallet of the at least one user to the identified cryptocurrency exchange in response to the payment acceptance;

receive the fiat currency converted in the identified cryptocurrency exchange from the purchase transaction-related number of cryptocurrency units in the chosen cryptocurrency; and transfer the cryptocurrency-based tax payment amount in the fiat currency to a secondary account of the at least one user, and the cryptocurrency-based payment of the purchase transaction in the fiat currency to an account of the merchant.

In some embodiments, the processor may be further configured to reject the cryptocurrency for storage in the cryptocurrency storage request from the plurality of cryptocurrency storage requests when the unit cost basis value for each cryptocurrency unit in the cryptocurrency storage request cannot be calculated.

In some embodiments, each cryptocurrency storage request may include cryptocurrency purchase information for calculating the unit cost basis value for each cryptocurrency unit in the fiat currency.

In some embodiments, the cryptocurrency purchase information may include:
i) at least one cryptocurrency type;
ii) at least one number of cryptocurrency units for each of the at least one cryptocurrency type;
iii) at least one acquisition time period for each of the at least one number of cryptocurrency units; and
iv) at least one exchange rate in the fiat currency at the at least one acquisition time period when acquiring each of the at least one number of cryptocurrency units.

In some embodiments, the processor may be configured to accept the cryptocurrency for storage for each respective cryptocurrency storage request from the plurality of cryptocurrency storage requests by relaying digital credentials for transferring the cryptocurrency for storage into each respective cryptocurrency wallet.

In some embodiments, the processor may be further configured to store the cryptocurrency for storage in the plurality of cryptocurrency wallets in a digital cryptocurrency wallet in a database in a memory of the server computer, in a hardware cryptocurrency wallet coupled to the server computer, or both.

In some embodiments, the processor may be further configured to:
receive a request to initiate communication with at least one user device associated with the at least one user for access to the cryptocurrency wallet of the at least one user when the at least one user device scans a bar code on a screen of a point-of-sale terminal of the merchant or when a link is activated on a webpage of the merchant; and
cause to display a graphic user interface for performing the purchase transaction on a screen of the at least one user device.

In some embodiments, the processor may be further configured to calculate the cryptocurrency-based tax payment amount due in the fiat currency when the best cryptocurrency exchange rate is greater than the unit cost basis value of the chosen cryptocurrency stored in the cryptocurrency wallet of the at least one user.

In some embodiments, the processor may be configured to transfer the purchase transaction-related number of cryptocurrency units in the chosen cryptocurrency to a server of the identified cryptocurrency exchange comprises verifying that a number of cryptocurrency units in the chosen cryptocurrency held in the cryptocurrency wallet of the at least one user is greater than the purchase transaction-related number of cryptocurrency units in the chosen cryptocurrency.

In some embodiments, the processor may be further configured to:
record in a user accounts database, the cryptocurrency payment tax amount due in the fiat currency from the purchase transaction and when the cryptocurrency payment tax amount due in the fiat currency was transferred to the secondary account;
cause to display on the GUI of the at least one user device, the balance of the secondary account indicating the cryptocurrency payment tax amount paid to the secondary account. and an accumulated total tax paid on cryptocurrency-based merchant transactions from the cryptocurrency wallet of the at least one user;
prepare a report of the cryptocurrency-based merchant transactions from the cryptocurrency wallet of the at least one user and a total payment tax amount due in the fiat currency of cryptocurrency-based merchant transactions recorded in the user accounts database for a tax preparer; and
transfer the accumulated total tax paid on the cryptocurrency-based merchant transactions from the cryptocurrency wallet of the at least one user held in the secondary account to an account of the tax authority.

A communication device includes a memory and a processor communicatively coupled to a communication network. The processor may be configured to:
receive a trigger that a user wants to perform a purchase transaction with a merchant;
send a request for access to a cryptocurrency wallet of a user in response to the trigger;
wherein the cryptocurrency wallet of the user is stored on a server communicating over the communication network;
display a graphic user interface (GUI) for performing the purchase transaction on a screen of the communication device of the user in response to the trigger;
wherein the GUI displays a plurality of cryptocurrencies held in the cryptocurrency wallet of the user;

send a purchase request from the user to perform the purchase transaction with the merchant to be paid in a cryptocurrency chosen by user on the GUI;

wherein the purchase request comprises a fiat purchase amount in the fiat currency;

receive a cryptocurrency purchase amount based on the fiat purchase amount and a best cryptocurrency exchange rate at an identified cryptocurrency exchange;

receive a tax payment amount due in the fiat currency when converting the chosen cryptocurrency to the fiat currency to pay for the purchase transaction when the best cryptocurrency exchange rate is greater than a unit cost basis value of the chosen cryptocurrency in the fiat currency stored in the cryptocurrency wallet of the user;

display on the GUI, a purchase transaction amount value, a tax payment amount value, and a value of the number of cryptocurrency units of the chosen cryptocurrency held in the cryptocurrency wallet of the user;

wherein the GUI displays the values in the chosen cryptocurrency, the fiat currency, or both;

send a payment acceptance for the purchase transaction to be paid in the chosen cryptocurrency and an approval by the user to pay the tax payment amount value in the purchase transaction;

receive a confirmation of the completion of the purchase transaction;

wherein the confirmation comprises the cryptocurrency tax payment amount due in the fiat currency, and when the cryptocurrency payment tax amount due in the fiat currency was transferred to a secondary account of the user; and display on the GUI, the confirmation, a balance of the secondary account indicating the cryptocurrency payment tax amount paid to the secondary account, and an accumulated total tax paid on cryptocurrency-based merchant transactions from the cryptocurrency wallet of the user.

In some embodiments, the communication device may include a camera. The processor may be configured to receive the trigger when the communication device scans a bar code on a screen of a point-of-sale terminal of the merchant with the camera.

In some embodiments, the processor may be configured to receive the trigger when the communication device pairs with a point-of-sale terminal of the merchant.

In some embodiments, the processor may be configured to receive the trigger over the communication network when the user activates a link on a webpage of the merchant.

In some embodiments, a method may include:

receiving, by a processor in a communication device communicatively coupled to a communication network, a trigger that a user wants to perform a purchase transaction with a merchant;

sending, by the processor, a request for access to a cryptocurrency wallet of a user in response to the trigger;

wherein the cryptocurrency wallet of the user is stored on a server communicating over the communication network;

displaying, by the processor, a graphic user interface (GUI) for performing the purchase transaction on a screen of the communication device of the user in response to the trigger;

wherein the GUI displays a plurality of cryptocurrencies held in the cryptocurrency wallet of the user;

sending, by the processor, a purchase request from the user to perform the purchase transaction with the merchant to be paid in a cryptocurrency chosen by user on the GUI;

wherein the purchase request comprises a fiat purchase amount in the fiat currency;

receiving, by the processor, a cryptocurrency purchase amount based on the fiat purchase amount and a best cryptocurrency exchange rate at an identified cryptocurrency exchange;

receiving, by the processor, a tax payment amount due in the fiat currency when converting the chosen cryptocurrency to the fiat currency to pay for the purchase transaction when the best cryptocurrency exchange rate is greater than a unit cost basis value of the chosen cryptocurrency in the fiat currency stored in the cryptocurrency wallet of the user;

displaying, by the processor on the GUI, a purchase transaction amount value, a tax payment amount value, and a value of the number of cryptocurrency units of the chosen cryptocurrency held in the cryptocurrency wallet of the user;

wherein the GUI displays the values in the chosen cryptocurrency, the fiat currency, or both;

sending, by the processor, a payment acceptance for the purchase transaction to be paid in the chosen cryptocurrency and an approval by the user to pay the tax payment amount value in the purchase transaction;

receiving, by the processor, a confirmation of the completion of the purchase transaction;

wherein the confirmation comprises the cryptocurrency tax payment amount due in the fiat currency, and when the cryptocurrency payment tax amount due in the fiat currency was transferred to a secondary account of the user; and displaying by the processor on the GUI, the confirmation, a balance of the secondary account indicating the cryptocurrency payment tax amount paid to the secondary account, and an accumulated total tax paid on cryptocurrency-based merchant transactions from the cryptocurrency wallet of the user.

In some embodiments, receiving the trigger may include scanning a bar code on a screen of a point-of-sale terminal of the merchant with a camera of the communication device.

In some embodiments, receiving the trigger may include pairing the communication device with a point-of-sale terminal of the merchant.

In some embodiments, receiving the trigger may include receiving the trigger over the communication networking when the user activates a link on a webpage of the merchant.

In some embodiments, a computer-implemented method may include:

receiving, by a server computer communicatively coupled to a communication network, a plurality of cryptocurrency storage requests to send cryptocurrency for storage in a plurality of cryptocurrency wallets associated with a plurality of respective users, wherein each respective cryptocurrency wallet may be managed by the server computer;

accepting, by the server computer, each cryptocurrency storage request from the plurality of cryptocurrency storage requests when each cryptocurrency storage request may include cryptocurrency purchase information for establishing a unit cost basis value for each cryptocurrency unit in a fiat currency, wherein the cryptocurrency purchase information may include:

i) at least one cryptocurrency type;
ii) at least one number of cryptocurrency units for each of the at least one cryptocurrency type;
iii) at least one acquisition time period for each of the at least one number of cryptocurrency units; and
iv) at least one exchange rate in the fiat currency at the at least one acquisition time period when acquiring each of the at least one number of cryptocurrency units;

storing, by the server computer, the cryptocurrency for storage in the plurality of cryptocurrency wallets over the communication network;

computing, by the server computer using the cryptocurrency purchase information from each cryptocurrency storage request, a unit cost basis value in the fiat currency for each cryptocurrency unit of each cryptocurrency type stored in each cryptocurrency wallet;

causing, by the server computer, to display a graphical user interface (GUI) on a screen of at least one user device associated with at least one user from the plurality of users when the at least one user desires to perform a purchase transaction with a merchant;

wherein the graphical user interface (GUI) may be displayed on the screen of the at least one user device when the at least one user accepts a communication request for the at least one user device to communicate with a computerized platform of the merchant over the communication network;

wherein the GUI may be configured to allow the at least one user to select whether to pay for the purchase transaction in at least one cryptocurrency stored in the cryptocurrency wallet of the at least one user;

receiving, by the server computer, from the at least one user device, a purchase request that is associated with a purchase transaction from a plurality of purchase transactions performed with a merchant to be paid in a cryptocurrency chosen by the at least one user of the plurality of users and stored in a cryptocurrency wallet of the plurality of cryptocurrency wallets;

wherein the purchase request may include a fiat purchase amount in the fiat currency;

communicating, by the server computer, in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency;

calculating, by the server computer, a cryptocurrency purchase amount based on the fiat purchase amount and the best cryptocurrency exchange rate;

calculating, by the server computer, a tax payment amount due when converting the chosen cryptocurrency to the fiat currency to pay for the purchase transaction when the best cryptocurrency exchange rate is greater than the unit cost basis value of the chosen cryptocurrency in the fiat currency stored in the cryptocurrency wallet of the at least one user;

causing, by the server computer, to display on the GUI, a purchase transaction amount value, a tax payment amount value, and a value of the number of cryptocurrency units of the chosen cryptocurrency held in the cryptocurrency wallet, wherein the GUI may display the values in the chosen cryptocurrency, the fiat currency, or both;

receiving, from the GUI, a payment acceptance of the purchase transaction to be paid in the chosen cryptocurrency including an approval by the at least one user to pay the tax payment amount value in the purchase transaction;

transferring, by the server computer, a purchase transaction-related number of cryptocurrency units in the chosen cryptocurrency to the server of the identified cryptocurrency exchange with the best cryptocurrency exchange rate over the communication network for conversion to the fiat currency, withdrawing, by the server computer, the purchase transaction-related number of cryptocurrency units in the chosen cryptocurrency from the cryptocurrency wallet of the at least one user;

receiving, by the server computer, the fiat currency converted in the identified cryptocurrency exchange over the communication network;

transferring, by the server computer, the cryptocurrency-based payment tax amount in the fiat currency to a secondary account of the at least one user when approved by the at least one user on the GUI, and the cryptocurrency-based payment of the purchase transaction in the fiat currency to an account of the merchant;

recording, by the server computer, in a user accounts database, the cryptocurrency payment tax amount due in the fiat currency from the purchase transaction and when the cryptocurrency payment tax amount due in the fiat currency was transferred to the secondary account; and causing, by the server computer, to display on the GUI, the balance of the secondary account indicating the cryptocurrency payment tax amount paid to the secondary account, and an accumulated total tax paid on cryptocurrency-based merchant transactions from the cryptocurrency wallet of the at least one user.

In some embodiments, the method may include rejecting, by the server computer, each cryptocurrency storage request when the unit cost basis value for each cryptocurrency unit in the fiat currency cannot be established from the cryptocurrency purchase information.

In some embodiments, accepting each storage request may include relaying digital credentials associated with each respective cryptocurrency wallet for transferring the cryptocurrency into each respective cryptocurrency wallet.

In some embodiments, storing the cryptocurrency for storage in the plurality of cryptocurrency wallets may include storing the cryptocurrency in a digital cryptocurrency wallet in a database in a memory of the server computer.

In some embodiments, storing the cryptocurrency for storage in the plurality of cryptocurrency wallets may include storing the cryptocurrency in a hardware cryptocurrency wallet coupled to the server computer.

In some embodiments, transferring the first purchase transaction-related number of first cryptocurrency units in the first chosen cryptocurrency to the server of the identified first cryptocurrency exchange may include verifying that the first number of cryptocurrency units of the first chosen cryptocurrency held in the cryptocurrency wallet is greater than the first purchase transaction-related number of first cryptocurrency units in the first chosen cryptocurrency.

In some embodiments, the method may include preparing, by the server computer, a report of the cryptocurrency-based merchant transactions from the cryptocurrency wallet of the at least one user and a total payment tax amount due in the fiat currency of cryptocurrency-based merchant transactions recorded in the user accounts database for a tax preparer.

In some embodiments, the method may include transferring, by the server computer, the accumulated total tax paid on cryptocurrency-based merchant transactions from the cryptocurrency wallet of the at least one user held in the secondary account to an account of the tax authority.

A server computer may include a memory and a processor, communicatively coupled to a communication network. The processor may be configured to:

receive a plurality of cryptocurrency storage requests to send cryptocurrency for storage in a plurality of cryptocurrency wallets associated with a plurality of respective users, wherein each respective cryptocurrency wallet may be managed by the server computer;

accept each cryptocurrency storage request from the plurality of cryptocurrency storage requests when each cryptocurrency storage request may include cryptocurrency purchase information for establishing a unit cost basis value for each cryptocurrency unit in a fiat currency, wherein the cryptocurrency purchase information may include:
  i) at least one cryptocurrency type;
  ii) at least one number of cryptocurrency units for each of the at least one cryptocurrency type;
  iii) at least one acquisition time period for each of the at least one number of cryptocurrency units; and
  iv) at least one exchange rate in the fiat currency at the at least one acquisition time period when acquiring each of the at least one number of cryptocurrency units;

store the cryptocurrency for storage in the plurality of cryptocurrency wallets over the communication network;

compute using the cryptocurrency purchase information from each cryptocurrency storage request, a unit cost basis value in the fiat currency for each cryptocurrency unit of each cryptocurrency type stored in each cryptocurrency wallet;

cause to display a graphical user interface (GUI) on a screen of at least one user device associated with at least one user from the plurality of users when the at least one user desires to perform a purchase transaction with a merchant;

wherein the graphical user interface (GUI) may be displayed on the screen of the at least one user device when the at least one user accepts a communication request for the at least one user device to communicate with a computerized platform of the merchant over the communication network;

wherein the GUI may be configured to allow the at least one user to select whether to pay for the purchase transaction in at least one cryptocurrency stored in the cryptocurrency wallet of the at least one user;

receive from the at least one user device, a purchase request that is associated with a purchase transaction from a plurality of purchase transactions performed with a merchant to be paid in a cryptocurrency chosen by the at least one user of the plurality of users and stored in a cryptocurrency wallet of the plurality of cryptocurrency wallets;

wherein the purchase request may include a fiat purchase amount in the fiat currency;

communicate in real time with multiple cryptocurrency exchange servers of respective multiple cryptocurrency exchanges over the communication network to identify a cryptocurrency exchange from the multiple cryptocurrency exchanges having a best cryptocurrency exchange rate for converting the chosen cryptocurrency to the fiat currency;

calculate a cryptocurrency purchase amount based on the fiat purchase amount and the best cryptocurrency exchange rate;

calculate a tax payment amount due when converting the chosen cryptocurrency to the fiat currency to pay for the purchase transaction when the best cryptocurrency exchange rate is greater than the unit cost basis value of the chosen cryptocurrency in the fiat currency stored in the cryptocurrency wallet of the at least one user;

cause to display on the GUI, a purchase transaction amount value, a tax payment amount value, and a value of the number of cryptocurrency units of the chosen cryptocurrency held in the cryptocurrency wallet, wherein the GUI may display the values in the chosen cryptocurrency, the fiat currency, or both;

receive, from the GUI, a payment acceptance of the purchase transaction to be paid in the chosen cryptocurrency including a approval by the at least one user to pay the tax payment amount value in the purchase transaction;

transfer a purchase transaction-related number of cryptocurrency units in the chosen cryptocurrency to the server of the identified cryptocurrency exchange with the best cryptocurrency exchange rate over the communication network for conversion to the fiat currency, withdraw the purchase transaction-related number of cryptocurrency units in the chosen cryptocurrency from the cryptocurrency wallet of the at least one user;

receive the fiat currency converted in the identified cryptocurrency exchange over the communication network;

transfer the cryptocurrency-based payment tax amount in the fiat currency to a secondary account of the at least one user when approved by the at least one user on the GUI, and the cryptocurrency-based payment of the purchase transaction in the fiat currency to an account of the merchant;

record in a user accounts database, the cryptocurrency payment tax amount due in the fiat currency from the purchase transaction and when the cryptocurrency payment tax amount due in the fiat currency was transferred to the secondary account; and cause to display on the GUI, the balance of the secondary account indicating the cryptocurrency payment tax amount paid to the secondary account. and an accumulated total tax paid on cryptocurrency-based merchant transactions from the cryptocurrency wallet of the at least one user.

In some embodiments, the processor may be further configured to reject each cryptocurrency storage request when the unit cost basis value for each cryptocurrency unit in the fiat currency cannot be established from the cryptocurrency purchase information.

In some embodiments, the processor may be configured to accept each storage request by relaying digital credentials associated with each respective cryptocurrency wallet for transferring the cryptocurrency into each respective cryptocurrency wallet.

In some embodiments, the processor is configured to store the cryptocurrency for storage in the plurality of cryptocurrency wallets by storing the cryptocurrency in a digital cryptocurrency wallet in a database in the memory of the server computer.

In some embodiments, the processor may be configured to store the cryptocurrency for storage in the plurality of cryptocurrency wallets by storing the cryptocurrency in a hardware cryptocurrency wallet coupled to the server computer.

In some embodiments, the processor may be configured to transfer the first purchase transaction-related number of first cryptocurrency units in the first chosen cryptocurrency to the server of the identified first cryptocurrency exchange by verifying that the first number of cryptocurrency units of the first chosen cryptocurrency held in the cryptocurrency wallet is greater than the first purchase transaction-related number of first cryptocurrency units in the first chosen cryptocurrency.

In some embodiments, the processor may be further configured to prepare a report of the cryptocurrency-based merchant transactions from the cryptocurrency wallet of the at least one user and a total payment tax amount due in the fiat currency of cryptocurrency-based merchant transactions recorded in the user accounts database for a tax preparer.

In some embodiments, the processor may be further configured to transfer the accumulated total tax paid on cryptocurrency-based merchant transactions from the cryptocurrency wallet of the at least one user held in the secondary account to an account of the tax authority.

In some embodiments, a computer-implemented method may include:

receiving, by a server computer communicatively coupled to a communication network, a plurality of cryptocurrency storage requests to send cryptocurrency for storage in a plurality of cryptocurrency wallets associated with a plurality of respective users, where each respective cryptocurrency wallet is managed by the server computer;

accepting, by the server computer, each cryptocurrency storage request from the plurality of cryptocurrency storage requests when each cryptocurrency storage request may include cryptocurrency purchase information for establishing a unit cost basis value for each cryptocurrency unit in a fiat currency, where the cryptocurrency purchase information may include:
  i) at least one cryptocurrency type;
  ii) at least one number of cryptocurrency units for each of the at least one cryptocurrency type;
  iii) at least one acquisition time period for each of the at least one number of cryptocurrency units; and
  iv) at least one exchange rate in the fiat currency at the at least one acquisition time period when acquiring each of the at least one number of cryptocurrency units;

storing, by the server computer, the cryptocurrency for storage in the plurality of cryptocurrency wallets over the communication network;

computing, by the server computer using the cryptocurrency purchase information from each cryptocurrency storage request, a unit cost basis value in the fiat currency for each cryptocurrency unit of each cryptocurrency type stored in each cryptocurrency wallet;

causing, by the server computer, to display a graphical user interface (GUI) on a screen of at least one user device associated with at least one user from the plurality of users when the at least one user desires to perform a purchase transaction with a merchant;

where the graphical user interface (GUI) is displayed on the screen of the at least one user device when the at least one user accepts a communication request for the at least one user device to communicate with a computerized platform of the merchant over the communication network;

where the GUI is configured to allow the at least one user to select whether to pay for the purchase transaction in at least one cryptocurrency stored in the cryptocurrency wallet of the at least one user;

receiving, by the server computer, from the at least one user device, a first purchase request that is associated with a first purchase transaction performed with a first merchant to be paid in a first cryptocurrency chosen by the at least one user of the plurality of users stored in a cryptocurrency wallet of the plurality of cryptocurrency wallets;

where the first purchase request may include a first fiat purchase amount in the fiat currency;

communicating, by the server computer, in real time with multiple cryptocurrency exchange servers of respective multiple cryptocurrency exchanges over the communication network to identify a first cryptocurrency exchange from the multiple cryptocurrency exchanges having a best first cryptocurrency exchange rate for converting the first chosen cryptocurrency to the fiat currency;

calculating, by the server computer, a first cryptocurrency purchase amount based on the first fiat purchase amount and the best first cryptocurrency exchange rate;

calculating, by the server computer, a first tax payment amount due when converting the first chosen cryptocurrency to the fiat currency to pay for the first purchase transaction when the best first cryptocurrency exchange rate is greater than the unit cost basis value of the first chosen cryptocurrency in the fiat currency stored in the cryptocurrency wallet of the at least one user;

causing, by the server computer, to display on the GUI, a first purchase transaction amount value, a first tax payment amount value, and a first value of the first number of cryptocurrency units of the first chosen cryptocurrency held in the cryptocurrency wallet, where the GUI displays the values in the first chosen cryptocurrency, the fiat currency, or both;

receiving, from the GUI, a first payment acceptance of the first purchase transaction to be paid in the first chosen cryptocurrency including a first approval by the at least one user to pay the first tax payment amount value in the first purchase transaction;

transferring, by the server computer, a first purchase transaction-related number of first cryptocurrency units in the first chosen cryptocurrency to the server of the identified first cryptocurrency exchange with the best first cryptocurrency exchange rate over the communication network for conversion to the fiat currency, withdrawing, by the server computer, the first purchase transaction-related number of cryptocurrency units in the first chosen cryptocurrency from the cryptocurrency wallet of the at least one user;

receiving, by the server computer, the fiat currency converted in the identified first cryptocurrency exchange over the communication network;

transferring, by the server computer, the first cryptocurrency-based payment tax amount in the fiat currency to a secondary account of the at least one user when approved by the at least one user on the GUI, and the first cryptocurrency-based payment of the first purchase transaction in the fiat currency to an account of the first merchant;

recording, by the server computer, in a user accounts database, the first cryptocurrency payment tax amount due in the fiat currency from the first purchase transaction and when the first cryptocurrency payment tax amount due in the fiat currency was transferred to the secondary account;

causing, by the server computer, to display on the GUI, the balance of the secondary account indicating the first cryptocurrency payment tax amount paid to the secondary account. and an accumulated total tax paid on cryptocurrency-based merchant transactions from the cryptocurrency wallet of the at least one user;

receiving, by the server computer, from the at least one user device, a second purchase request that is associated with a second purchase transaction performed with a second merchant to be paid in a second cryptocurrency chosen by the at least one user of the plurality of users stored in the cryptocurrency wallet of the plurality of cryptocurrency wallets;

where the second purchase request may include a second fiat purchase amount in the fiat currency;

communicating, by the server computer, in real time with multiple cryptocurrency exchange servers of respective multiple cryptocurrency exchanges over the communication network to identify a second cryptocurrency exchange from the multiple cryptocurrency exchanges having a best second cryptocurrency exchange rate for converting the second chosen cryptocurrency to the fiat currency;

calculating, by the server computer, a second cryptocurrency purchase amount based on the second fiat purchase amount and the best second cryptocurrency exchange rate;

calculating, by the server computer, a second tax payment amount due when converting the second chosen cryptocurrency to the fiat currency to pay for the second purchase transaction when the best second cryptocurrency exchange rate is greater than the unit cost basis value of the second chosen cryptocurrency in the fiat currency stored in the cryptocurrency wallet of the at least one user;

causing, by the server computer, to display on the GUI, a second purchase transaction amount value, a second tax payment amount value, and a second value of the second number of cryptocurrency units of the second chosen cryptocurrency held in the cryptocurrency wallet, where the GUI displays the values in the second chosen cryptocurrency, the fiat currency, or both;

receiving, from the GUI, a second payment acceptance of the second purchase transaction to be paid in the second chosen cryptocurrency including a second approval by the at least one user to pay the second tax payment amount value in the second purchase transaction;

transferring, by the server computer, a second purchase transaction-related number of second cryptocurrency units in the second chosen cryptocurrency to the server of the identified second cryptocurrency exchange with the best second cryptocurrency exchange rate over the communication network for conversion to the fiat currency, withdrawing, by the server computer, the second purchase transaction-related number of cryptocurrency units in the second chosen cryptocurrency from the cryptocurrency wallet of the at least one user;

receiving, by the server computer, the fiat currency converted in the identified second cryptocurrency exchange over the communication network;

transferring, by the server computer, the second cryptocurrency-based payment tax amount in the fiat currency to the secondary account of the at least one user when approved by the at least one user on the GUI, and the second cryptocurrency-based payment of the second purchase transaction in the fiat currency to the account of the second merchant;

recording, by the server computer, in the user accounts database, the second cryptocurrency payment tax amount due in the fiat currency from the second purchase transaction and when the second cryptocurrency payment tax amount due in the fiat currency was transferred to the secondary account; and causing, by the server computer, to display on the GUI, the balance of the secondary account indicating the second cryptocurrency payment tax amount paid to the secondary account and the accumulated total tax paid on cryptocurrency-based merchant transactions from the cryptocurrency wallet of the at least one user.

A server computer may include a memory and a processor, communicatively coupled to a communication network. The processor may be configured to:

receive a plurality of cryptocurrency storage requests to send cryptocurrency for storage in a plurality of cryptocurrency wallets associated with a plurality of respective users, where each respective cryptocurrency wallet is managed by the server computer;

accept each cryptocurrency storage request from the plurality of cryptocurrency storage requests when each cryptocurrency storage request may include cryptocurrency purchase information for establishing a unit cost basis value for each cryptocurrency unit in a fiat currency, where the cryptocurrency purchase information may include:
 i) at least one cryptocurrency type;
 ii) at least one number of cryptocurrency units for each of the at least one cryptocurrency type;
 iii) at least one acquisition time period for each of the at least one number of cryptocurrency units; and
 iv) at least one exchange rate in the fiat currency at the at least one acquisition time period when acquiring each of the at least one number of cryptocurrency units;

store the cryptocurrency for storage in the plurality of cryptocurrency wallets over the communication network;

compute using the cryptocurrency purchase information from each cryptocurrency storage request, a unit cost basis value in the fiat currency for each cryptocurrency unit of each cryptocurrency type stored in each cryptocurrency wallet;

cause to display a graphical user interface (GUI) on a screen of at least one user device associated with at least one user from the plurality of users when the at least one user desires to perform a purchase transaction with a merchant;

where the graphical user interface (GUI) is displayed on the screen of the at least one user device when the at least one user accepts a communication request for the at least one user device to communicate with a computerized platform of the merchant over the communication network;

where the GUI is configured to allow the at least one user to select whether to pay for the purchase transaction in at least one cryptocurrency stored in the cryptocurrency wallet of the at least one user;

receive from the at least one user device, a first purchase request that is associated with a first purchase transaction performed with a first merchant to be paid in a first cryptocurrency chosen by the at least one user of the plurality of users stored in a cryptocurrency wallet of the plurality of cryptocurrency wallets;

where the first purchase request may include a first fiat purchase amount in the fiat currency;

communicate in real time with multiple cryptocurrency exchange servers of respective multiple cryptocurrency exchanges over the communication network to identify a first cryptocurrency exchange from the multiple cryptocurrency exchanges having a best first cryptocurrency exchange rate for converting the first chosen cryptocurrency to the fiat currency;

calculate a first cryptocurrency purchase amount based on the first fiat purchase amount and the best first cryptocurrency exchange rate;

calculate a first tax payment amount due when converting the first chosen cryptocurrency to the fiat currency to pay for the first purchase transaction when the best first cryptocurrency exchange rate is greater than the unit cost basis value of the first chosen cryptocurrency in the fiat currency stored in the cryptocurrency wallet of the at least one user;

cause to display on GUI, a first purchase transaction amount value, a first tax payment amount value, and a first value of the first number of cryptocurrency units of the first chosen cryptocurrency held in the cryptocurrency wallet, where the GUI displays the values in the first chosen cryptocurrency, the fiat currency, or both;

receive, from GUI, a first payment acceptance of the first purchase transaction to be paid in the first chosen cryptocurrency including a first approval by the at least one user to pay the first tax payment amount value in the first purchase transaction;

transfer a first purchase transaction-related number of first cryptocurrency units in the first chosen cryptocurrency to the server of the identified first cryptocurrency exchange with the best first cryptocurrency exchange rate over the communication network for conversion to the fiat currency, withdraw the first purchase transaction-related number of cryptocurrency units in the first chosen cryptocurrency from the cryptocurrency wallet of the at least one user;

receive the fiat currency converted in the identified first cryptocurrency exchange over the communication network;

transfer the first cryptocurrency-based payment tax amount in the fiat currency to a secondary account of the at least one user when approved by the at least one user on the GUI, and the first cryptocurrency-based payment of the first purchase transaction in the fiat currency to an account of the first merchant;

record in a user accounts database, the first cryptocurrency payment tax amount due in the fiat currency from the first purchase transaction and when the first cryptocurrency payment tax amount due in the fiat currency was transferred to the secondary account;

cause to display on the GUI, the balance of the secondary account indicating the first cryptocurrency payment tax amount paid to the secondary account. and an accumulated total tax paid on cryptocurrency-based merchant transactions from the cryptocurrency wallet of the at least one user;

receive from the at least one user device, a second purchase request that is associated with a second purchase transaction performed with a second merchant to be paid in a second cryptocurrency chosen by the at least one user of the plurality of users stored in the cryptocurrency wallet of the plurality of cryptocurrency wallets;

where the second purchase request may include a second fiat purchase amount in the fiat currency;

communicate in real time with multiple cryptocurrency exchange servers of respective multiple cryptocurrency exchanges over the communication network to identify a second cryptocurrency exchange from the multiple cryptocurrency exchanges having a best second cryptocurrency exchange rate for converting the second chosen cryptocurrency to the fiat currency;

calculate a second cryptocurrency purchase amount based on the second fiat purchase amount and the best second cryptocurrency exchange rate;

calculate a second tax payment amount due when converting the second chosen cryptocurrency to the fiat currency to pay for the second purchase transaction when the best second cryptocurrency exchange rate is greater than the unit cost basis value of the second chosen cryptocurrency in the fiat currency stored in the cryptocurrency wallet of the at least one user;

cause to display on the GUI, a second purchase transaction amount value, a second tax payment amount value, and a second value of the second number of cryptocurrency units of the second chosen cryptocurrency held in the cryptocurrency wallet, where the GUI displays the values in the second chosen cryptocurrency, the fiat currency, or both;

receive, from the GUI, a second payment acceptance of the second purchase transaction to be paid in the second chosen cryptocurrency including a second approval by the at least one user to pay the second tax payment amount value in the second purchase transaction;

transfer a second purchase transaction-related number of second cryptocurrency units in the second chosen cryptocurrency to the server of the identified second cryptocurrency exchange with the best second cryptocurrency exchange rate over the communication network for conversion to the fiat currency, withdraw the second purchase transaction-related number of cryptocurrency units in the second chosen cryptocurrency from the cryptocurrency wallet of the at least one user;

receive the fiat currency converted in the identified second cryptocurrency exchange over the communication network;

transfer the second cryptocurrency-based payment tax amount in the fiat currency to the secondary account of the at least one user when approved by the at least one user on the GUI, and the second cryptocurrency-based payment of the second purchase transaction in the fiat currency to the account of the second merchant;

record in the user accounts database, the second cryptocurrency payment tax amount due in the fiat currency from the second purchase transaction and when the second cryptocurrency payment tax amount due in the fiat currency was transferred to the secondary account; and cause to display on the GUI, the balance of the secondary account indicating the second cryptocurrency payment tax amount paid to the secondary account and the accumulated total tax paid on cryptocurrency-based merchant transactions from the cryptocurrency wallet of the at least one user.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:

receiving, by a server computer communicating over a communication network, a request to accept cryptocurrency for storage in a cryptocurrency wallet associated with at least one user, the cryptocurrency wallet being stored in a database;

executing, by the server computer, a unit cost basis value calculation to calculate a unit cost basis value in a fiat currency for each cryptocurrency unit of the cryptocurrency;

rejecting, by the server computer, the request to accept the cryptocurrency for storage in the cryptocurrency wallet when the unit cost basis value calculation fails;

accepting, by the server computer, the cryptocurrency for storage in the cryptocurrency wallet when the unit cost basis value is calculated;

receiving, by the server computer, over the communication network, a purchase request from at least one communication device associated with the at least one user to perform a purchase transaction with a merchant to be paid in the cryptocurrency;

wherein the purchase request comprises a fiat purchase amount in the fiat currency;

wherein the unit cost basis value is used for computing taxes due when cryptocurrency is converted to the fiat currency to pay for the purchase transaction;

communicating, by the server computer, over the communication network, in response to the purchase request, in real time with multiple cryptocurrency exchange servers of respective multiple cryptocurrency exchanges to identify cryptocurrency exchanges from the multiple cryptocurrency exchanges having cryptocurrency exchange rates for converting each cryptocurrency stored in the cryptocurrency wallet of the at least one user to the fiat currency;

computing, by the server computer, in response to the purchase request:
(i) an amount of cryptocurrency to pay for the purchase transaction based on the fiat purchase amount and the cryptocurrency exchange rates for each cryptocurrency, and
(ii) an amount of cryptocurrency to pay a tax due based on the cryptocurrency exchange rates and the unit cost basis value for each cryptocurrency;
transmitting, by the server computer, over the communication network, instructions to the at least one communication device to display on a graphic user interface (GUI) of the at least one communication device:
(i) each cryptocurrency stored in the cryptocurrency wallet of the at least one user;
(ii) the amount of cryptocurrency to pay for the purchase transaction in each cryptocurrency; and
(iii) the amount of cryptocurrency to pay the tax due for each cryptocurrency;
receiving, by the server computer, over the communication network, through the GUI, a payment acceptance from the at least one user to use a purchase transaction-related number of cryptocurrency units in at least one chosen cryptocurrency to pay:
(i) the purchase transaction, and
(ii) a cryptocurrency-based tax payment amount in the fiat currency due when converting the at least one chosen cryptocurrency to the fiat currency to pay for the purchase transaction;
transferring, by the server computer, over the communication network, the purchase transaction-related number of cryptocurrency units in the at least one chosen cryptocurrency from the cryptocurrency wallet of the at least one user to the cryptocurrency exchange server of the identified cryptocurrency exchange having the cryptocurrency exchange rate for the at least one chosen cryptocurrency in response to the payment acceptance;
receiving, by the server computer, over the communication network, the fiat currency converted in the identified cryptocurrency exchange from the purchase transaction-related number of cryptocurrency units in the at least one chosen cryptocurrency;
transferring, by the server computer, over the communication network, the cryptocurrency-based tax payment amount in the fiat currency to a secondary account of the at least one user, and the cryptocurrency-based payment of the purchase transaction in the fiat currency to an account of the merchant;
generating, by the server computer, a tax report for the cryptocurrency wallet associated with the at least one user comprising:
(i) a plurality of cryptocurrency-based merchant transactions from the cryptocurrency wallet of the at least one user, and
(ii) a total payment tax amount due in the fiat currency for the plurality of cryptocurrency-based merchant transactions;
transferring, by the server computer, over the communication network, the tax report to a computing device associated with a tax authority; and
transferring, by the server computer, over the communication network, the total payment tax amount due in the fiat currency for the plurality of cryptocurrency-based merchant transactions held in the secondary account to an account of the tax authority.

2. The method according to claim 1, wherein the request to accept the cryptocurrency for storage comprises cryptocurrency purchase information for the unit cost basis value calculation.

3. The method according to claim 2, wherein the cryptocurrency purchase information comprises:
   i) at least one cryptocurrency type;
   ii) at least one number of cryptocurrency units for each of the at least one cryptocurrency type;
   iii) at least one acquisition time period for each of the at least one number of cryptocurrency units; and
   iv) at least one exchange rate in the fiat currency at the at least one acquisition time period when acquiring each of the at least one number of cryptocurrency units.

4. The method according to claim 1, wherein rejecting the request to accept the cryptocurrency for storage comprises refusing to relay digital credentials for transferring the cryptocurrency for storage into the cryptocurrency wallet.

5. The method according to claim 1, further comprising storing, by the server computer, the cryptocurrency for storage in a digital cryptocurrency wallet in the database in a memory of the server computer, in a hardware cryptocurrency wallet coupled to the server computer, or both.

6. The method according to claim 1, further comprising:
receiving, by the server computer, over the communication network, a request to initiate communication with the at least one communication device associated with the at least one user for access to the cryptocurrency wallet of the at least one user when the at least one communication device scans a bar code on a screen of a point-of-sale terminal of the merchant or when a link is activated on a webpage of the merchant; and
transmitting, by the server computer, over the communication network, instructions to the at least one communication device to display the graphic user interface for performing the purchase transaction on a screen of the at least one communication device.

7. The method according to claim 1, wherein computing the amount of cryptocurrency to pay, the tax due for each cryptocurrency comprises calculating the tax due when the cryptocurrency exchange rate is greater than the unit cost basis value for each cryptocurrency stored in the cryptocurrency wallet of the at least one user.

8. A server computer, comprising:
a memory; and
a processor, communicating over a communication network and configured to:
receive a request to accept cryptocurrency for storage in a cryptocurrency wallet associated with at least one user, the cryptocurrency wallet being stored in a database;
execute a unit cost basis value calculation to calculate a unit cost basis value in a fiat currency for each cryptocurrency unit of the cryptocurrency;
reject the request to accept the cryptocurrency for storage in the cryptocurrency wallet when the unit cost basis value calculation fails;
accept the cryptocurrency for storage in the cryptocurrency wallet when the unit cost basis value is calculated;
receive, over the communication network, a purchase request from at least one communication device associated with the at least one user to perform a purchase transaction with a merchant to be paid in the cryptocurrency;
wherein the purchase request comprises a fiat purchase amount in the fiat currency;

wherein the unit cost basis value is used for computing taxes due when cryptocurrency is converted to the fiat currency to pay for the purchase transaction;

communicate over the communication network, in response to the purchase request, in real time with multiple cryptocurrency exchange servers of respective multiple cryptocurrency exchanges to identify cryptocurrency exchanges from the multiple cryptocurrency exchanges having cryptocurrency exchange rates for converting each cryptocurrency stored in the cryptocurrency wallet of the at least one user to the fiat currency;

compute in response to the purchase request:
(i) an amount of cryptocurrency to pay for the purchase transaction based on the fiat purchase amount and the cryptocurrency exchange rates for each cryptocurrency, and
(ii) an amount of cryptocurrency to pay a tax due based on the cryptocurrency exchange rates and the unit cost basis value for each cryptocurrency;

transmit over the communication network, instructions to the at least one communication device to display on a graphic user interface (GUI) of the at least one communication device:
(i) each cryptocurrency stored in the cryptocurrency wallet of the at least one user;
(ii) the amount of cryptocurrency to pay for the purchase transaction in each cryptocurrency; and
(iii) the amount of cryptocurrency to pay the tax due for each cryptocurrency;

receive over the communication network, through the GUI, a payment acceptance from the at least one to use a purchase transaction-related number of cryptocurrency units in at least one chosen cryptocurrency to pay:
(i) the purchase transaction, and
(ii) a cryptocurrency-based tax payment amount in the fiat currency due when converting the at least one chosen cryptocurrency to the fiat currency to pay for the purchase transaction;

transfer over the communication network, the purchase transaction-related number of cryptocurrency units in the at least one chosen cryptocurrency from the cryptocurrency wallet of the at least one user to the cryptocurrency exchange server of the identified cryptocurrency exchange having the cryptocurrency exchange rate for the at least one chosen cryptocurrency in response to the payment acceptance;

receive over the communication network, the fiat currency converted in the identified cryptocurrency exchange from the purchase transaction-related number of cryptocurrency units in the at least one chosen cryptocurrency;

transfer over the communication network, the cryptocurrency-based tax payment amount in the fiat currency to a secondary account of the at least one user, and the cryptocurrency-based payment of the purchase transaction in the fiat currency to an account or the merchant;

generate a tax report for the cryptocurrency wallet associated with the at least one user comprising:

(i) a plurality of cryptocurrency-based merchant transactions from the cryptocurrency wallet of the at least one user, and
(ii) a total payment tax amount due in the fiat currency for the plurality of cryptocurrency-based merchant transactions;

transfer over the communication network, the tax report to a computing device associated with a tax authority; and transfer over the communication network, the total payment tax amount due in the fiat currency for the plurality of cryptocurrency-based merchant transactions held in the secondary account to an account of the tax authority.

9. The server computer according to claim 8, wherein the request to accept the cryptocurrency for storage comprises cryptocurrency purchase information for the unit cost basis value calculation.

10. The server computer according to claim 9, wherein the cryptocurrency purchase information comprises:
i) at least one cryptocurrency type;
ii) at least one number of cryptocurrency units for each of the at least one cryptocurrency type;
iii) at least one acquisition time period for each of the at least one number of cryptocurrency units; and
iv) at least one exchange rate in the fiat currency at the at least one acquisition time period when acquiring each of the at least one number of cryptocurrency units.

11. The server computer according to claim 8, wherein the processor is configured to reject the request to accept the cryptocurrency for storage by refusing to relay digital credentials for transferring the cryptocurrency for storage into the cryptocurrency wallet.

12. The server computer according to claim 8, wherein the processor is further configured to store the cryptocurrency for storage in a digital cryptocurrency wallet in the database in a memory of the server computer, in a hardware cryptocurrency wallet coupled to the server computer, or both.

13. The server computer according to claim 8, wherein the processor is further configured to:
receive over the communication network, a request to initiate communication with the at least one communication device associated with the at least one user for access to the cryptocurrency wallet of the at least one user when the at least one communication device scans a bar code on a screen of a point-of-sale terminal of the merchant or when a link is activated on a webpage of the merchant; and
transmit over the communication network, instructions to the at least one communication device to display the graphic user interface for performing the purchase transaction on a screen of the at least one communication device.

14. The server computer according to claim 8, wherein the processor is configured to compute the amount of cryptocurrency to pay the tax due for each cryptocurrency by calculating the tax due when the cryptocurrency exchange rate is greater than the unit cost basis value for each cryptocurrency stored in the cryptocurrency wallet of the at least one user.

* * * * *